US009173198B2

(12) United States Patent
Faurie et al.

(10) Patent No.: US 9,173,198 B2
(45) Date of Patent: Oct. 27, 2015

(54) METHODS AND APPARATUS TO INDICATE SPACE REQUIREMENTS FOR COMMUNICATING CAPABILITIES OF A DEVICE

(75) Inventors: René Faurie, Courbevoie (FR); David Philip Hole, Southampton (GB); Werner Karl Kreuzer, Baiern (DE)

(73) Assignee: BlackBerry Limited, Waterloo, Ontario (CA)

( * ) Notice: Subject to any disclaimer, the term of this patent is extended or adjusted under 35 U.S.C. 154(b) by 338 days.

(21) Appl. No.: 13/038,151

(22) Filed: Mar. 1, 2011

(65) Prior Publication Data

US 2011/0217980 A1 Sep. 8, 2011

(30) Foreign Application Priority Data

Mar. 3, 2010 (EP) .................................... 10290108

(51) Int. Cl.
*H04W 72/00* (2009.01)
*H04W 72/04* (2009.01)
*H04W 8/22* (2009.01)

(52) U.S. Cl.
CPC ................ *H04W 72/04* (2013.01); *H04W 8/22* (2013.01)

(58) Field of Classification Search
CPC ..... H04W 16/02; H04W 16/04; H04W 16/10; H04W 16/12; H04W 28/16; H04W 28/18; H04W 28/26; H04W 72/00; H04W 72/02; H04W 72/04
USPC .......................... 455/450–455; 370/329–338
See application file for complete search history.

(56) References Cited

U.S. PATENT DOCUMENTS

| | | | | |
|---|---|---|---|---|
| 5,818,829 | A | 10/1998 | Raith et al. | |
| 6,633,559 | B1 | 10/2003 | Raith et al. | |
| 6,772,112 | B1 | 8/2004 | Ejzak | |
| 6,813,280 | B2 * | 11/2004 | Vanttinen et al. | 370/477 |
| 6,870,858 | B1 | 3/2005 | Sebire | |
| 6,963,544 | B1 | 11/2005 | Balachandran et al. | |
| 7,392,051 | B2 | 6/2008 | Rajala et al. | |

(Continued)

FOREIGN PATENT DOCUMENTS

| | | |
|---|---|---|
| CN | 1338192 | 2/2002 |
| CN | 1964293 | 5/2007 |

(Continued)

OTHER PUBLICATIONS

Patent Cooperation Treaty, "International Search Report," issued by the International Searching Authority in connection with PCT application No. PCT/IB2011/050862, mailed May 18, 2011 (4 pages).

(Continued)

*Primary Examiner* — Amancio Gonzalez
(74) *Attorney, Agent, or Firm* — Fish & Richardson P.C.

(57) ABSTRACT

Example methods and apparatus to indicate space requirements for communicating capabilities of a device are disclosed. In accordance with a disclosed example method, a request is sent to a network to request a quantity of blocks to be allocated for use by a mobile station. The quantity of blocks is determined based on a data size to identify radio access capabilities of the mobile station. An allocation of the quantity of blocks is received from the network. Radio access capability information of the mobile station is sent via the allocated blocks.

17 Claims, 13 Drawing Sheets

(56) References Cited

U.S. PATENT DOCUMENTS

| | | | | |
|---|---|---|---|---|
| 7,433,334 | B2 * | 10/2008 | Marjelund et al. | 370/329 |
| 7,843,895 | B2 | 11/2010 | Park et al. | |
| 8,085,725 | B2 | 12/2011 | Zhou | |
| 8,238,895 | B2 | 8/2012 | Sorbara et al. | |
| 8,243,667 | B2 | 8/2012 | Chun et al. | |
| 8,249,009 | B2 * | 8/2012 | Ishii et al. | 370/329 |
| 8,284,725 | B2 | 10/2012 | Ahmadi | |
| 8,363,671 | B2 | 1/2013 | Korhonen et al. | |
| 8,498,347 | B2 * | 7/2013 | Kawamura et al. | 375/260 |
| 8,767,571 | B2 | 7/2014 | Faurie et al. | |
| 8,848,653 | B2 * | 9/2014 | Edge et al. | 370/331 |
| 2002/0080758 | A1 * | 6/2002 | Landais | 370/338 |
| 2002/0126630 | A1 | 9/2002 | Vanttinen et al. | |
| 2003/0002457 | A1 | 1/2003 | Womack et al. | |
| 2003/0117995 | A1 | 6/2003 | Koehn et al. | |
| 2003/0133426 | A1 | 7/2003 | Schein et al. | |
| 2004/0077348 | A1 | 4/2004 | Sebire et al. | |
| 2004/0184440 | A1 | 9/2004 | Higuchi et al. | |
| 2004/0196826 | A1 | 10/2004 | Bao et al. | |
| 2004/0248575 | A1 | 12/2004 | Rajala et al. | |
| 2004/0264421 | A1 | 12/2004 | Sato et al. | |
| 2005/0030919 | A1 | 2/2005 | Lucidarme et al. | |
| 2006/0035634 | A1 | 2/2006 | Swann et al. | |
| 2006/0072520 | A1 | 4/2006 | Chitrapu et al. | |
| 2007/0064665 | A1 | 3/2007 | Zhang et al. | |
| 2007/0115816 | A1 * | 5/2007 | Sinivaara | 370/230 |
| 2007/0136279 | A1 | 6/2007 | Zhou et al. | |
| 2007/0147326 | A1 | 6/2007 | Chen | |
| 2007/0149206 | A1 | 6/2007 | Wang et al. | |
| 2007/0165567 | A1 | 7/2007 | Tan et al. | |
| 2007/0224990 | A1 | 9/2007 | Edge et al. | |
| 2007/0265012 | A1 | 11/2007 | Sorbara et al. | |
| 2007/0291696 | A1 | 12/2007 | Zhang et al. | |
| 2008/0049708 | A1 | 2/2008 | Khan et al. | |
| 2008/0080627 | A1 | 4/2008 | Korhonen et al. | |
| 2008/0084849 | A1 | 4/2008 | Wang et al. | |
| 2008/0107055 | A1 | 5/2008 | Sim et al. | |
| 2008/0188220 | A1 | 8/2008 | DiGirolamo et al. | |
| 2008/0225785 | A1 | 9/2008 | Wang et al. | |
| 2008/0233992 | A1 * | 9/2008 | Oteri et al. | 455/522 |
| 2008/0240028 | A1 | 10/2008 | Ding et al. | |
| 2008/0267127 | A1 | 10/2008 | Narasimha et al. | |
| 2008/0273610 | A1 | 11/2008 | Malladi et al. | |
| 2008/0316961 | A1 | 12/2008 | Bertrand et al. | |
| 2009/0046629 | A1 | 2/2009 | Jiang et al. | |
| 2009/0046676 | A1 | 2/2009 | Krishnaswamy et al. | |
| 2009/0109908 | A1 | 4/2009 | Bertrand et al. | |
| 2009/0109937 | A1 | 4/2009 | Cave et al. | |
| 2009/0141685 | A1 | 6/2009 | Berglund | |
| 2009/0197587 | A1 | 8/2009 | Frank | |
| 2009/0201868 | A1 | 8/2009 | Chun et al. | |
| 2009/0220017 | A1 | 9/2009 | Kawamura et al. | |
| 2009/0232107 | A1 | 9/2009 | Park et al. | |
| 2009/0232236 | A1 | 9/2009 | Yamamoto et al. | |
| 2009/0233615 | A1 | 9/2009 | Schmitt | |
| 2009/0239568 | A1 | 9/2009 | Bertrand et al. | |
| 2009/0252125 | A1 | 10/2009 | Vujcic | |
| 2009/0316638 | A1 | 12/2009 | Yi et al. | |
| 2009/0318175 | A1 | 12/2009 | Sandberg | |
| 2010/0041393 | A1 | 2/2010 | Kwon et al. | |
| 2010/0054235 | A1 | 3/2010 | Kwon et al. | |
| 2010/0074130 | A1 | 3/2010 | Bertrand et al. | |
| 2010/0074246 | A1 | 3/2010 | Harada et al. | |
| 2010/0099393 | A1 | 4/2010 | Brisebois et al. | |
| 2010/0112992 | A1 | 5/2010 | Stadler et al. | |
| 2010/0118816 | A1 | 5/2010 | Choi et al. | |
| 2010/0120443 | A1 | 5/2010 | Ren | |
| 2010/0130220 | A1 | 5/2010 | Laroia et al. | |
| 2010/0159919 | A1 | 6/2010 | Wu | |
| 2010/0172299 | A1 | 7/2010 | Fischer et al. | |
| 2010/0195574 | A1 | 8/2010 | Richeson et al. | |
| 2010/0202354 | A1 | 8/2010 | Ho | |
| 2010/0220713 | A1 | 9/2010 | Tynderfeldt et al. | |
| 2010/0254356 | A1 | 10/2010 | Tynderfeldt et al. | |
| 2010/0284376 | A1 | 11/2010 | Park et al. | |
| 2011/0038361 | A1 | 2/2011 | Park et al. | |
| 2011/0069800 | A1 | 3/2011 | Ohta et al. | |
| 2011/0107172 | A1 | 5/2011 | Chapman et al. | |
| 2011/0216718 | A1 | 9/2011 | Faurie et al. | |
| 2011/0216719 | A1 | 9/2011 | Faurie et al. | |
| 2011/0216720 | A1 | 9/2011 | Faurie et al. | |
| 2011/0305197 | A1 | 12/2011 | Park et al. | |
| 2012/0250659 | A1 | 10/2012 | Sambhwani | |

FOREIGN PATENT DOCUMENTS

| | | |
|---|---|---|
| CN | 101079666 | 11/2007 |
| CN | 101154992 | 4/2008 |
| CN | 101188465 | 5/2008 |
| CN | 101330452 | 12/2008 |
| CN | 101390431 | 3/2009 |
| CN | 101426292 | 5/2009 |
| EP | 0 951 192 | 10/1999 |
| EP | 1 791 307 | 5/2007 |
| EP | 2 023 548 | 2/2009 |
| EP | 2 034 755 | 3/2009 |
| EP | 2 043 391 | 4/2009 |
| EP | 2 101 538 | 9/2009 |
| EP | 2 104 339 | 9/2009 |
| EP | 2141938 | 1/2010 |
| EP | 2187578 | 5/2010 |
| FR | 2831009 | 4/2003 |
| GB | 2 448 889 | 11/2008 |
| TW | 200614735 | 8/2008 |
| TW | 201026131 | 7/2010 |
| WO | 94/05095 | 3/1994 |
| WO | 9826625 | 6/1998 |
| WO | 0054536 | 9/2000 |
| WO | 0079823 | 12/2000 |
| WO | 01/11907 | 2/2001 |
| WO | 01/63839 | 8/2001 |
| WO | 0117283 | 8/2001 |
| WO | 2005039201 | 4/2005 |
| WO | 2007109695 | 9/2007 |
| WO | 2008097626 | 8/2008 |
| WO | 2008136488 | 11/2008 |
| WO | 2009/059518 | 5/2009 |
| WO | 2009/088873 | 7/2009 |
| WO | 2009088160 | 7/2009 |
| WO | 2009155833 | 12/2009 |

OTHER PUBLICATIONS

Patent Cooperation Treaty, “Written Opinion of the International Searching Authority,” issued by the International Searching Authority in connection with PCT/IB2011/050862, mailed May 18, 2011 (8 pages).

Patent Cooperation Treaty, “International Search Report,” issued by the International Searching Authority in connection with PCT application No. PCT/IB2011/050864, mailed May 24, 2011 (4 pages).

Patent Cooperation Treaty, “Written Opinion of the International Searching Authority,” issued by the International Searching Authority in connection with PCT/IB2011/050864, mailed May 24, 2011 (6 pages).

Patent Cooperation Treaty, “International Search Report,” issued by the International Searching Authority in connection with PCT application No. PCT/IB2011/050866, mailed May 18, 2011 (4 pages).

Patent Cooperation Treaty, “Written Opinion of the International Searching Authority,” issued by the International Searching Authority in connection with PCT/IB2011/050866, mailed May 18, 2011 (7 pages).

Patent Cooperation Treaty, “International Search Report,” issued by the International Searching Authority in connection with PCT application No. PCT/IB2011/050867, mailed May 18, 2011 (4 pages).

Patent Cooperation Treaty, “Written Opinion of the International Searching Authority,” issued by the International Searching Authority in connection with PCT/IB2011/050867, mailed May 18, 2011 (7 pages).

European Patent Office, “Extended European Search Report,” issued in connection with EP Application No. 10290104.8-1249, dated Aug. 25, 2010, (9 pages).

(56) References Cited

OTHER PUBLICATIONS

European Patent Office, "Extended European Search Report," issued in connection with EP Application No. 10290106.3-1249, dated Sep. 8, 2010, (6 pages).
European Patent Office, "Extended European Search Report," issued in connection with EP Application No. 10290107.1-1249, dated Aug. 25, 2010, (8 pages).
LG Electronics: "Uplink resource request for uplink scheduling", 3GPP Draft; R1-060922 UL REQUEST_WITH TP, 3RD Generation Partnership Project (3GPP), Athens, Greece, Mar. 27-31, 2006, 4 pages.
Panasonic: "DRX and DTX Operation in LTE_Active" 3GPP Draft; R2-060888, 3RD Generation Partnership Project (3GPP), Athens, Greece, Mar. 27-31, 2006, 3 pages.
"3rd Generational Partnership Project; Technical Specification Group Services and System Aspects; Vocabulary for 3GPP Specifications (Release 9)," 3GPP TR 21.905 V9.4.0, Dec. 19, 2009, (57 pages).
"3rd Generational Partnership Project; Group Core Network and Terminals; Mobile radio interface Layer 3 specification; Core network protocols; Stage 3 (Release 9)," 3GPP TS 24.008 V9.1.0, Dec. 18, 2009, (595 pages).
"3rd Generational Partnership Project; Technical Specification Group GSM/EDGE Radio Access Network; Mobile radio interface layer 3 specification; Radio Resource Control (RRC) protocol (Release 9)," 3GPP TS 44.018 V9.3.0, Dec. 18, 2009, (428 pages).
"3rd Generational Partnership Project; Technical Specification Group Gsm/Edge Radio Access Network; General Packet Radio Service (Gprs); Mobile Station (MS)—Base Station System (Bss) interface; Radio Link Control/Medium Access Control (RLC/MAC) protocol (Release 9)," 3GPP TS 44.060 V9.2.0, Dec. 18, 2009, (596 pages).
European Patent Office, "Extended European Search Report," issued in connection with EP Application No. 10290108.9-1249, dated Aug. 25, 2010, (8 pages).
"3rd Generation Partnership Project; Technical Specification Group GSM/EDGE Radio Access Network; Radio Subsystem Synchronization (Release 9)," 3GPP TS 45.010 V9.0.0, Nov., 2009, (31 pages).
"3rd Generation Partnership Project; Technical Specification Group GSM/EDGE Radio Access Network; Channel Coding (Release 9)," 3GPP TS 45.003 V9.0.0, Dec., 2009, (321 pages).
"3rd Generation Partnership Project; Technical Specification Group GSM/EDGE Radio Access Network; Multiplexing and Multiple Access on the Radio Path (Release 9)," 3GPP TS 45.002 V9.2.0, Nov., 2009, (108 pages).
United States Patent and Trademark Office, "Final Office Action," issued in connection with U.S. Appl. No. 13/038,138, on Jul. 5, 2013 (29 pages).
Taiwan Patent Office, "Office Action," issued in connection with Taiwain Patent Application No. 100106773 on Jun. 26, 2013, 12 pages.
European Patent Office, "Communication under Rule 71(3) EPC," issued in connection with European Application No. 10290106.3, dated Apr. 26, 2012, (7 pages).
European Patent Office, "Decision to Grant pursuant to Article 97(1) EPC," issued in connection with European Application No. 10290106.3, dated Aug. 23, 2012, (2 pages).
Patent Cooperation Treaty, "International Preliminary Report on Patentability," issued by the International Bureau Authority in connection with PCT application No. PCT/IB2011/050862, issued Sep. 4, 2012 (7 pages).
Patent Cooperation Treaty, "International Preliminary Report on Patentability," issued by the International Bureau Authority in connection with PCT application No. PCT/IB2011/050864, issued Sep. 4, 2012 (6 pages).
Patent Cooperation Treaty, "International Preliminary Report on Patentability," issued by the International Bureau Authority in connection with PCT application No. PCT/IB2011/050866, issued Sep. 4, 2012 (7 pages).
Patent Cooperation Treaty, "International Preliminary Report on Patentability," issued by the International Bureau Authority in connection with PCT application No. PCT/IB2011/050867, issued Sep. 4, 2012 (7 pages).
United States Patent and Trademark Office, "Non-Final Office Action," issued in connection with U.S. Appl. No. 13/038,135, on Feb. 22, 2013 (30 pages).
United States Patent and Trademark Office, "Non-Final Office Action," issued in connection with U.S. Appl. No. 13/038,138, on Mar. 11, 2013 (31 pages).
United States Patent and Trademark Office, "Non-Final Office Action," issued in connection with U.S. Appl. No. 13/038,145, on Mar. 25, 2013 (28 pages).
Patent Cooperation Treaty, "International Preliminary Report on Patentability," issued by the International Bureau Authority in connection with PCT application No. PCT/IB2011/050862, issued Sep. 4, 2012, 7 pages.
United States Patent and Trademark Office, "Final Office Action," issued in connection with U.S. Appl. No. 13/038,135, on Aug. 22, 2013, 33 pages.
United States Patent and Trademark Office, "Final Office Action," issued in connection with U.S. Appl. No. 13/038,145, on Aug. 28, 2013, 31 pages.
F. Andreasen, "Session Description Protocol (SCP) Simple Capability Declaration," Network Working Group, RFC 3407, Oct. 2002, 11 pages.
Taiwan Patent Office, "Office Action," issued in connection with Taiwan Patent Application No. 100106778 on Aug. 29, 2013, 7 pages.
Taiwan Patent Office, "Office Action," issued in connection with Taiwan Patent Application No. 100106779 on Oct. 15, 2013, 11 pages.
Taiwan Patent Office, "Office Action," issued in connection with Taiwan Patent Application No. 100106772 on Oct. 22, 2013, 9 pages.
White Paper, "Long Term Evolution Protocol Overview," Freescale Semiconductor, Oct. 2008, 21 pages.
Taiwan Patent Office, "Office Action," issued in connection with Taiwan Patent Application No. 100108167 on Aug. 8, 2013, 12 pages.
Taiwan Patent Office, "Notice of Allowance," issued in connection with Taiwan Patent Application No. 100108153 on Nov. 25, 2013, 5 p.ages.
Intellectual Property Office, "Office Action," issued in connection with Taiwanese Patent Application No. 100106772 on Apr. 9, 2014 (6 pages).
United States Patent and Trademark Office, "Notice of Allowance," issued in connection with United States Application No. 13/038,138 on Feb. 28, 2014 (5 pages).
Canadian Intellectual Property Office, "Exam Report," issued in connection with Canadian Application No. 2,791,824, on Jul. 24, 2014(3 pages).
State Intellectual Property Office of People's Republic of China, "Office Action," issued in connection with Chinese Patent Application No. 201180022121.0, on Sep. 25, 2014 (7 pages).
State Intellectual Property Office of People's Republic of China, "First Office Action," issued in connection with Chinese Patent Application No. 201180022169.1, on Nov. 15, 2014 (6 pages).
Taiwan Patent Office, "Notice of Allowance," issued in connection with Taiwanese Patent Application No. 100106772, on Dec. 8, 2014 (5 pages).
Canadian Office Action in Canadian Application No. 2,791,857, dated Sep. 10, 2014, 3 pages.
Chinese Office Action in Chinese Application No. 201180022120.6, dated Oct. 22, 2014, 13 pages.
Chinese Office Action in Chinese Application No. 201180022121.0, dated Sep. 25, 2014, 7 pages.

* cited by examiner

500

414 → { 0 | 1 < MS Radio Access Capability ...

416 → < ADDITIONAL MS RAC INFORMATION AVAILABLE ...

```
< Packet Resource Request message content > ::=
    { 0 | 1 < ACCESS_TYPE : bit (2) > }
    {0 < Global TFI : < Global TFI IE > > | 1 < TLLI / G-RNTI : < TLLI / G-RNTI IE > > }
    { 0 | 1 < MS Radio Access Capability : < MS Radio Access Capability IE > > }
    < Channel Request Description : < Channel Request Description IE > >
    { 0 | 1 < CHANGE_MARK : bit (2) > }
    < C_VALUE : bit (6) >
    { 0 | 1 < SIGN_VAR : bit (6) > }
    { 0 | 1 < I_LEVEL_TN0 : bit (4) > }
    { 0 | 1 < I_LEVEL_TN1 : bit (4) > }
    { 0 | 1 < I_LEVEL_TN2 : bit (4) > }
    { 0 | 1 < I_LEVEL_TN3 : bit (4) > }
    { 0 | 1 < I_LEVEL_TN4 : bit (4) > }
    { 0 | 1 < I_LEVEL_TN5 : bit (4) > }
    { 0 | 1 < I_LEVEL_TN6 : bit (4) > }
    { 0 | 1 < I_LEVEL_TN7 : bit (4) > }
    { 0 | 1 < EGPRS BEP Link Quality Measurements : < EGPRS BEP Link Quality Measurements IE >> }
    { 0 | 1 < EGPRS Timeslot Link Quality Measurements : < EGPRS Timeslot Link Quality Measurements IE >>}
    { 0 | 1 < PFI: bit(7) > }
    < ADDITIONAL MS RAC INFORMATION AVAILABLE : bit (1) >
    < RETRANSMISSION OF PRR : bit (1) >
    < EARLY_TBF_ESTABLISHMENT : bit (1) >
    { 0 | 1 < EGPRS BEP Link Quality Measurements Type 2 : < EGPRS BEP Link Quality Measurements Type 2 IE > > }
    { 0 | 1 < EGPRS Timeslot Link Quality Measurements Type 2 : <EGPRS Timeslot Link Quality Measurements Type 2 IE > > }
    < padding bits > };
```

USE-TYPE RADIO ACCESS CAPABILITIES STRUCTURES

| USE-TYPE CODE | DATA TRANSFER TYPE | |
|---|---|---|
| 00h | TYPE A (E.G., GENERAL STRUCT) | 604a |
| 01h | TYPE B (E.G., MACHINE TYPE COMM. STRUCT) | 604b |
| 02h | TYPE C (E.G., UPLINK COMM. STRUCT) | 604c |
| 03h | TYPE D (E.G., SMALL DATA TRANS. STRUCT) | 604d |

RADIO ACCESS CAPABILITIES CONFIGURATIONS FOR GPRS

| GPRS RAC CONFIG ID | RADIO ACCESS CAPABILITY INFORMATION | |
|---|---|---|
| GPRS#01 | *CAPABILITIES SETTINGS 1 FOR GPRS CAPABILITY SUBSET* | 704a |
| GPRS#02 | *CAPABILITIES SETTINGS 2 FOR GPRS CAPABILITY SUBSET* | 704b |
| GPRS#03 | *CAPABILITIES SETTINGS 3 FOR GPRS CAPABILITY SUBSET* | 704c |

RADIO ACCESS CAPABILITIES CONFIGURATIONS FOR DTM

| DTM RAC CONFIG ID | RADIO ACCESS CAPABILITY INFORMATION | |
|---|---|---|
| DTM#01 | *CAPABILITIES SETTINGS 1 FOR DTM CAPABILITY SUBSET* | 708a |
| DTM#02 | *CAPABILITIES SETTINGS 2 FOR DTM CAPABILITY SUBSET* | 708b |

STRUCTURES FOR MS RADIO ACCESS CAPABILITIES IE

802

```
<MS Radio Access capability value part > ::=
    { < Coding form #0 : 00 >  < General capabilities : < General capabilities struct >>
    |  < Coding form #1 : 01 > < MTC capabilities : < MTC capabilities struct >>
    |  < Coding form #2 : 02 > < Uplink capabilities : < Uplink capabilities struct >>

    ! <Coding form Error: { 11} bit (*) = < no string >> -- Reserved
    <spare bits>** ; -- Expands to the indicated length, only for type-length value (TLV)
                          information element (IE) form  }
```

804

```
< General capabilities struct > ::=  -- General capabilities - first level structure with recursive coding
    < Detailed general capabilities length : bit (7) > -- Bit length of Detailed general capabilities struct
    < bit (val (Detailed general capabilities length))
        & {< Detailed general capabilities :
        < Detailed general capabilities struct > > ! { bit** = <no string> }} >
    { 1 < Compressed general capabilities : < Additional access technologies struct > > } ** 0
    { 0 | 1 < General capabilities struct > } ;  -- Recursive description

< Detailed general capabilities struct > ::=
    {
    < Access Technology Type : bit (4) >
    { 1 < Access Technology Type : bit (4) > } ** 0  -- Indicates applicability to multiple frequency bands
    < GMSK Power Class : bit (3) >
    < GMSK Multislot Power Profile : bit (2) >
    < GPRS Multislot class : bit (5) >
    < GPRS Extended Dynamic Allocation Capability : bit >

    { 0 | 1 -- EGPRS capable mobile station
        < 8PSK Power Class : bit (2) > ;
        < 8-PSK Multislot Power Profile : bit (2) >
        { 0 | 1 < EGPRS Multislot class : bit (5) > }  -- Not indicated if same as for GPRS
        < EGPRS Extended Dynamic Allocation Capability : bit >
        < Modulation based multislot class support : bit >
    }

    { 0 | 1 < DTM Capabilities : < DTM Capabilities struct > > }
    < UMTS FDD Radio Access Technology Capability : bit >                -- 3G RAT
    < UMTS 3.84 Mcps TDD Radio Access Technology Capability : bit >      -- 3G RAT
    < CDMA 2000 Radio Access Technology Capability : bit >               -- 3G RAT
    < UMTS 1.28 Mcps TDD Radio Access Technology Capability : bit >      -- 3G RAT

    { 0 | 1 < High Multislot Capability : bit(2) > }
    < Downlink Advanced Receiver Performance : bit(2) >
    < Extended RLC/MAC Control Message Segmentation Capability : bit >
    < PS Handover Capability : bit >
    { 0 | 1 < Multislot Capability Reduction for Downlink Dual Carrier : bit (3) >
            < Downlink Dual Carrier for DTM Capability : bit> }
    < Flexible Timeslot Assignment : bit >
    < GAN PS Handover Capability : bit >
    < RLC Non-persistent Mode : bit >
    < Reduced Latency Capability : bit >
    < Uplink EGPRS2 : bit(2) >
    < Downlink EGPRS2 : bit(2) >
    < E-UTRA FDD support : bit >
    < E-UTRA TDD support : bit >
    < GERAN to E-UTRA support in GERAN packet transfer mode : bit(2) >
    < Enhanced Flexible Timeslot Assignment : Enhanced Flexible Timeslot Assignment Struct >
    < Indication of Upper Layer PDU Start Capability for RLC UM : bit >
    < EMST Capability : bit >
    <spare bits>** -- Expands to the indicated length
    } // ; – The receiver shall assume the value zero for any truncated field.
```

FIG. 8A

STRUCTURES FOR MS RADIO ACCESS CAPABILITIES IE (CONTINUED)

804

```
< DTM Capabilities struct > ::=
    < DTM GPRS Multi Slot Class: bit(2)>
    < Single Slot DTM : bit>
    { 0 | 1 <DTM EGPRS Multi Slot Class : bit(2)> }
    { 0 | 1 < Extended DTM GPRS Multi Slot Class : bit(2) >
              < Extended DTM EGPRS Multi Slot Class : bit(2) > }
    < DTM Enhancements Capability : bit >
    { 0 | 1 < DTM GPRS High Multi Slot Class : bit(3) >
    { 0 | 1 < DTM EGPRS High Multi Slot Class : bit(3) > } }
    < DTM Handover Capability : bit > ;
```

806

```
< MTC capabilities struct > ::=        -- MTC capabilities - first level structure with recursive coding
    < Detailed MTC capabilities Length : bit (7) > -- Bit length of Detailed MTC capabilities struct
    < bit (val (Detailed MTC capabilities length))
        & {< Detailed MTC capabilities :
        < Detailed MTC capabilities struct > > } ! { bit** = <no string> }} >
    { 1 < Additional MTC capabilities : < Additional access technologies struct > > } ** 0
    { 0 | 1 < MTC capabilities struct > } ;  -- Recursive description

< Detailed MTC capabilities struct  > ::=  -- Describes specific access capabilities
                                              sent at initial access for MTC
    {
    < Access Technology Type : bit (4) >
    < GMSK Power Class : bit (3) >
    < GMSK Multislot Power Profile : bit (2) >
    < GPRS Multislot class : bit (5) >
    < GPRS Extended Dynamic Allocation Capability : bit >

    { 0 | 1 -- EGPRS capable mobile station
        < 8PSK Power Class : bit (2) > ;
        < 8-PSK Multislot Power Profile : bit (2) >
        { 0 | 1 < EGPRS Multislot class : bit (5) > }  -- Not indicated if same as for GPRS
        < EGPRS Extended Dynamic Allocation Capability : bit >
    }

    < Downlink Advanced Receiver Performance : bit(2) >
    < Flexible Timeslot Assignment : bit >
    < Reduced Latency Capability : bit >
    < MTC specific capabilities : < MTC specific capabilities struct >
    <spare bits>**  -- Expands to the indicated length
    } // ; -- The receiver shall assume the value zero for any truncated field.
```

FIG. 8B

STRUCTURES FOR MS RADIO ACCESS CAPABILITIES IE (CONTINUED)

808
```
< Uplink capabilities struct > ::=        -- Uplink capabilities - first level structure with recursive coding

    < Detailed uplink capabilities length : bit (7) > -- Bit length of Detailed uplink capabilities struct
    < bit (val (Detailed uplink capabilities length))
        & {< Detailed uplink capabilities :
        < Detailed uplink capabilities struct > > ! { bit** = <no string> }} >
    { 1 < Compressed uplink capabilities: < Additional access technologies struct > > } ** 0
    { 0 | 1 < Uplink capabilities struct > } ;      -- Recursive description

< Detailed uplink capabilities struct > ::=
    {
    < Access Technology Type : bit (4) >
    < GMSK Power Class : bit (3) >
    < GMSK Multislot Power Profile : bit (2) >
    < GPRS Multislot class : bit (5) >
    < GPRS Extended Dynamic Allocation Capability : bit >

    { 0 | 1 -- EGPRS capable mobile station
        < 8PSK Power Class : bit (2) > ;
        < 8-PSK Multislot Power Profile : bit (2) >
        { 0 | 1 < EGPRS Multislot class : bit (5) > } -- Not indicated if same as for GPRS
        < EGPRS Extended Dynamic Allocation Capability : bit >
        < Modulation based multislot class support : bit >
    }

    < UMTS FDD Radio Access Technology Capability : bit >                  -- 3G RAT
    < UMTS 3.84 Mcps TDD Radio Access Technology Capability : bit >        -- 3G RAT
    < CDMA 2000 Radio Access Technology Capability : bit >                 -- 3G RAT
    < UMTS 1.28 Mcps TDD Radio Access Technology Capability : bit >        -- 3G RAT

    { 0 | 1 < High Multislot Capability : bit(2) > }
    < Extended RLC/MAC Control Message Segmentation Capability : bit >
    < RLC Non-persistent Mode : bit >
    < Reduced Latency Capability : bit >
    < Uplink EGPRS2 : bit(2) >
    < E-UTRA FDD support : bit >
    < E-UTRA TDD support : bit >
    < GERAN to E-UTRA support in GERAN packet transfer mode : bit(2) >
    < Indication of Upper Layer PDU Start Capability for RLC UM : bit >
    < EMST Capability : bit >
    <spare bits>** -- Expands to the indicated length
    } // ; -- The receiver shall assume the value zero for any truncated field.
```

810
```
< SDT capabilities struct > ::=        -- SDT capabilities - first level structure with recursive coding

    < Detailed SDT capabilities length : bit (7) > -- Bit length of Detailed SDT capabilities struct
    < bit (val (Detailed SDT capabilities length))
        & {< Detailed SDT capabilities :
        < Detailed SDT capabilities struct > > ! { bit** = <no string> }} >
    { 1 < Compressed SDT capabilities: < Additional access technologies struct > > } ** 0
    { 0 | 1 < SDT capabilities struct > } ;      -- Recursive description

< Detailed SDT capabilities struct > ::=
    { ... }
```

812
```
< Additional access technologies struct > ::=
    < Access Technology Type : bit (4) >
    { 1 < Access Technology Type : bit (4) > } ** 0  -- Indicate multiple frequency band capabilities
    < GMSK Power Class : bit (3) >
    < 8PSK Power Class : bit (2) > ;
```

FIG. 8C

MOBILE STATION

METHODS AND APPARATUS TO INDICATE SPACE REQUIREMENTS FOR COMMUNICATING CAPABILITIES OF A DEVICE

RELATED APPLICATIONS

This patent claims priority to European Patent Application No. 10290108.9, filed Mar. 3, 2010, which is hereby incorporated by reference herein in its entirety.

FIELD OF THE DISCLOSURE

The present disclosure relates generally to network communications and, more particularly, to methods and apparatus to indicate space requirements for communicating capabilities of a device.

BACKGROUND

Mobile communication devices exchange information with mobile communication networks by signaling requests to connect with the mobile communication networks. Such is the case when placing telephone calls and/or transmitting data using mobile communication devices. In some wireless and mobile communication systems, a mobile communication device can establish such a data transfer session with a network by signaling its communication capabilities to the network and requesting that the network allocate a data channel for use by the mobile communication device to transfer its data to the network.

BRIEF DESCRIPTION OF THE DRAWINGS

FIG. 5 is an example arrangement of content of a packet resource request message of FIGS. 2-4.

FIG. 6 is a table showing example use-type codes that can be used in connection with the packet resource request message of FIGS. 2-5 to identify respective use-type radio access capabilities structures encoded in the Packet Resource Request message.

FIGS. 7A and 7B depict tables showing example pre-defined radio access capabilities configurations of mobile stations.

FIGS. 8A-8C depict example structural formats that can be used to send radio access capabilities information of mobile systems to access networks during the example signaling exchanges of FIGS. 2-4.

DETAILED DESCRIPTION

Figure 1:
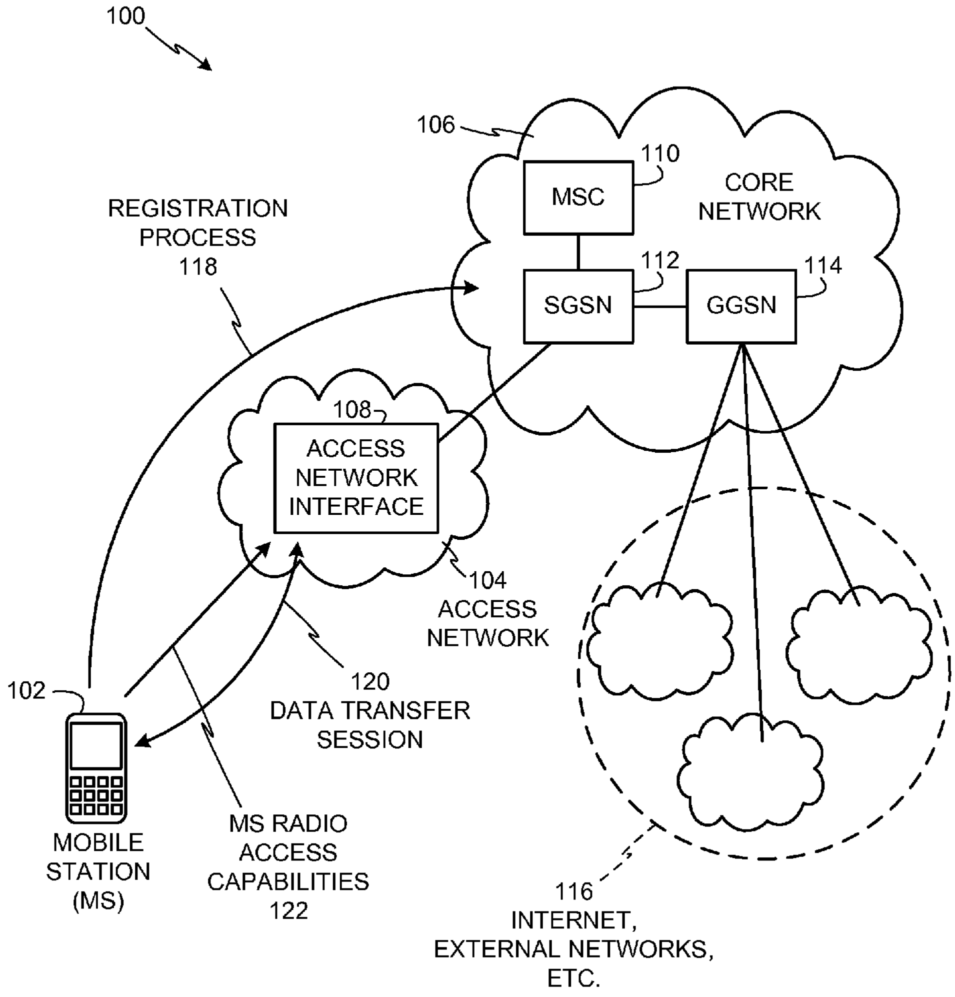
FIG. 1 depicts an example communications network in which the example methods and apparatus disclosed herein may be implemented.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The example methods and apparatus described herein can be used in connection with mobile stations such as mobile communication devices, mobile computing devices, or any other element, entity, device, or service capable of communicating wirelessly with a wireless network. Mobile stations, also referred to as terminals, wireless terminals, or user equipment (UE), may include mobile smart phones (e.g., a BlackBerry® smart phone), wireless personal digital assistants (PDA), laptop/notebook/netbook computers with wireless adapters, etc.

The example methods and apparatus described herein can be used to signal capabilities of mobile stations (e.g., access-stratum radio access capabilities) for data transfer sessions between the mobile stations and access networks. The example methods and apparatus are described herein as being implemented in connection with GSM (Global System for Mobile communications) networks, General Packet Radio Service (GPRS) networks, Enhanced Data Rates for GSM Evolution (EDGE) networks (or Enhanced GPRS (EGPRS)), and other mobile communication networks to implement data transfers between such networks and mobile stations. However, the example methods and apparatus may additionally or alternatively be implemented in connection with other types of wireless networks including other types of mobile communication networks to implement data transfers.

The example methods and apparatus disclosed herein can be used in connection with different types of data transfer sessions including, for example, small data transfer (SDT) sessions, machine-to-machine data transfer sessions, uplink data transfer sessions, and/or any other type of data transfer sessions including any combination thereof. Data transfers enable mobile stations to send data to networks on an as-needed basis and can be triggered by different subsystems of a mobile station upon the need to send information to a network. Such information may be generated by the mobile station (e.g., mobile station status information) or may be user-generated information (e.g., messaging, profile changes). When a data transfer need arises, a mobile station may request a connection (e.g., one or more resources for uplink transmission) with a network.

To establish a data transfer session, a network may allocate resources (e.g., data channels, timeslots, spreading codes, etc.) to a mobile station in accordance with radio access capabilities (RACs) of the mobile station. A temporary block flow (TBF) is an example of a data transfer session. The capabilities of the mobile station that are known to the network affect the manner in which the network communicates with the mobile station. For instance, the network may limit a connection with the mobile station to particular features or may enable further features for the connection based on the capabilities of the mobile station. Therefore, the mobile station may perform a capabilities signaling to communicate information concerning its radio access capabilities to a radio access network. Such capabilities can be related to packet switched radio access capabilities or circuit switched radio access capabilities.

Examples of different types of radio access capabilities communicated by the mobile station to the network include supported GSM frequency bands (e.g., GSM 900, GSM 1800, GSM 1900), multislot classes associated with different modes of operation (e.g., GPRS multislot class, EGPRS multislot class, dual transfer mode (DTM) multislot class for GPRS or EGPRS, high multislot class), radio transmission capabilities (e.g., radio frequency (RF) power capabilities, 8 phase shift keying (8PSK) power capabilities, Gaussian minimum shift keying (GMSK)/8PSK power profile), supported features (e.g., Downlink Advanced Receiver Performance (DARP), packet-switched (PS) handover, flexible timeslot assignment, reduced latency, downlink dual carrier, uplink/downlink EGPRS2), and additional supported radio access technologies (e.g., Universal Mobile Telecommunications System (UMTS) frequency-division duplexing (FDD) or time-division duplexing (TDD), code division multiple access (CDMA) 2000, Evolved Universal Terrestrial Radio Access (E-UTRA) FDD or TDD).

Figure 2:
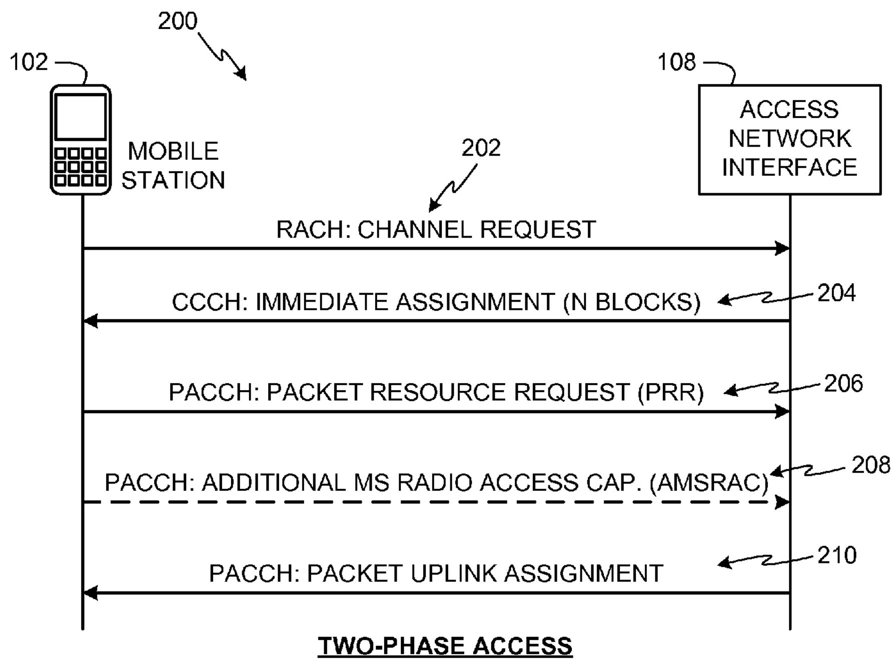
FIG. 2 is an example signaling exchange that can be used to establish a data transfer session between a mobile station and an access network using a two-phase access procedure.
Figure 3:
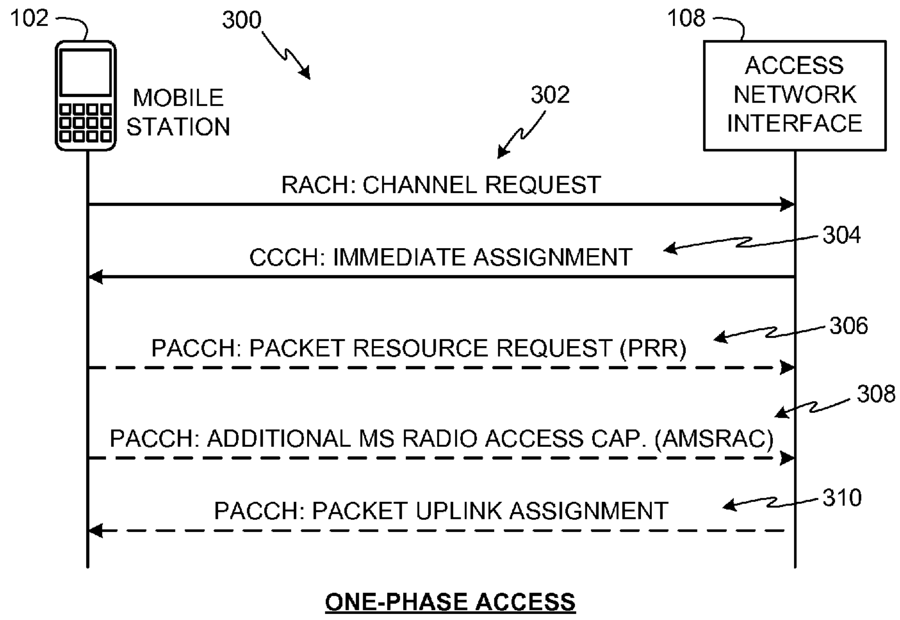
FIG. 3 is an example signaling exchange that can be used to establish a data transfer session between a mobile station and an access network using a one-phase access procedure.

Radio access capabilities of a mobile station may be signaled or sent to an access network using a two-phase access procedure or a one-phase access procedure. A two-phase access procedure enables sending relatively more capabilities information of a mobile station to an access network prior to setting up a data transfer session between the mobile station and the access network than does a one-phase access procedure. Example two-phase and one-phase access procedures are depicted in FIGS. 2 and 3 and are described below in connection with the example methods and apparatus disclosed herein.

A drawback of using known capabilities signaling techniques in connection with the two-phase access or one-phase access procedures is that mobile stations, in some instances, cannot communicate all of their radio access capabilities in order to perform data transfer sessions. For example, in the one-phase access procedure, a single message (a channel request message) is used by the mobile station to obtain a data channel allocation from an access network to allow the mobile station to perform its data transfer. The channel request message in the one-phase access procedure provides limited space (e.g., two bits) for communicating the radio access capabilities of the mobile station. Thus, relatively little information to describe the capabilities of the mobile station can be communicated to the access network using the one-phase access procedure.

The two-phase access procedure provides one or two messages for use by the mobile station to communicate its radio access capabilities to the access network prior to establishing a data transfer session. However, known capabilities signaling techniques associated with the two-phase access procedure also often do not provide sufficient space to transfer the complete radio access capabilities of a mobile station. Two previously specified and accepted techniques for the two-phase access procedure are used in known systems. The first technique requires that a mobile station repeats all capabilities for each GSM frequency band (i.e., an Access Technology Type) supported by the mobile station, even though the capabilities may be the same across every frequency band supported by that mobile station. Thus, use of the first technique can result in a relatively high rate of redundancy. In the second technique, a mobile station must include the full capabilities only for one GSM frequency band and communicate a reduced capabilities set for other bands for which the mobile station has the same basic capabilities. Thus, in the second technique, the mobile station need not repeat capabilities that are common to all of its supported frequency bands.

Although the second known technique described above for signaling radio access capabilities in a two-phase access procedure provides relatively more space for communicating such capabilities, both the first and second known techniques have become significantly limiting over time as new Access Technology Types and capabilities are defined for mobile stations. For example, at the introduction of GPRS in Release 97 of the GSM standard, a mobile station radio access capability information element (MS radio access capability IE) (i.e., an information element used in a message to convey radio access capabilities of a mobile station to establish a data transfer connection) was specified and capable of indicating all capabilities of a mobile station known at the time. At that time, a relatively short MS radio access capability IE was sufficient for describing the full capabilities of a mobile station. However, features of EGPRS, new frequency bands, radio access technologies (RATs), and other capabilities have been since introduced (in the GSM specification under the 3rd Generation Partnership Project (3GPP)) and have lead to increasing the size of the MS radio access capability IE for a mobile station supporting these features or capabilities.

The MS radio access capability IE can be truncated as required, depending on the available space in a message in which it is being sent by a mobile station. Newer capabilities information is typically appended to the end of the MS radio access capability IE in chronological order of the specification of the corresponding feature/capability. Truncating the MS radio access capability IE affects the ability to communicate relatively newer (e.g., more recently specified) capabilities to an access network while a mobile station attempts to establish a data transfer session. Thus, a truncated MS radio access capability IE may result in the access network not advantageously using features that the mobile station supports. That is, upon receiving a MS radio access capability IE from a mobile station, an access network must assume that the mobile station does not support any feature and/or frequency band which is not explicitly indicated (e.g., truncated capabilities) as being supported.

As a result of the lengthier message or quantity of messages needed to communicate mobile station radio access capabilities to an access network, establishing data transfer sessions using known techniques can be relatively inefficient. Such inefficiencies can be particularly notable for small data transfers. For example, the data transfer setup signaling messages may require transmitting more information than the relatively small quantity (e.g., a quantity of data below a pre-determined threshold characteristic of small data transfers) of data transmitted during a small data transfer session such that the signaling overhead to establish communications may become relatively significant in comparison to the transmitted data. The impact of such inefficient signaling can have a significantly negative impact on battery life of a mobile station, on the utilization of network resources, and on the time required for performing the data transfer.

Unlike known techniques, the example methods and apparatus disclosed herein provide relatively more efficient procedures and data formats that can be used to communicate radio access capabilities of mobile stations to access networks for establishing data transfer connections. In some instances, the example techniques disclosed herein involve omitting capabilities from a MS radio access capabilities IE that are not relevant to a type of use for a particular data transfer session and/or omitting legacy radio access capabilities. Relevant capabilities may include, for example, relevant multislot classes, relevant switching times, and relevant packet switched handover capabilities indicated by a mobile station to an access network as supported by the mobile station. Also, the techniques described herein enable or facilitate omitting capabilities not related to GSM communications (or not relevant to an access technology used between a mobile station and an access network and/or core network). In addition, some techniques described herein may be used to implicitly or expressly inform an access network when radio access capabilities information communicated by a mobile station is not complete and may further indicate that further (e.g., complete) radio access capabilities of the mobile station can be obtained from a core network. In some example implementations, some omitted legacy radio access capabilities are mandatory capabilities that are assumed by access networks as being supported by mobile stations (e.g., based on the indicated support of other, non-mandatory features, or based on the use of any of the techniques described herein), while other omitted legacy radio access capabilities are those that are typically no longer used to establish data transfer connections with access networks.

In some example implementations described herein, to enable the mobile station to send radio access capabilities that are relevant to a particular data transfer session between the mobile station and a network, the mobile station can generate a message having a structural format that is adaptable or changeable to indicate different radio access capabilities information of the mobile station. In this manner, the mobile station can indicate a relevant subset of its different radio access capabilities in the message. The indicated subset can be associated with a specific type of use (e.g., a machine-to-machine data transfer use, an uplink data transfer use, a small data transfer use) by the mobile station for the data transfer session. The mobile station can then send the message to the network to request a data channel resource for a data transfer connection.

As described in further detail below, communicating radio access capabilities relevant to a particular data transfer can be accomplished through the use of use-type radio access capabilities structures. Example use-type capabilities structures include a machine type communication (MTC) capabilities structure, an uplink capabilities structure, a small data transfer (SDT) capabilities structure, and a general capabilities structure. The MTC capabilities structure can be used by a mobile station to communicate relevant radio access capabilities when establishing a machine-to-machine data transfer session. The uplink capabilities structure can be used by a mobile station to communicate relevant radio access capabilities when establishing a data transfer session for an uplink only data transfer. The SDT capabilities structure can be used by a mobile station to communicate relevant radio access capabilities when establishing a data transfer session for a small data transfer. The general capabilities structure (e.g., an exhaustive or complete capabilities structure) can be used to communicate an exhaustive or full list of radio access capabilities of a mobile station when establishing a data transfer session. The general capabilities structure can be used when a use-type of a data transfer session is undetermined, when the data transfer session is to be used for multiple types of uses (e.g., a multi-purpose data transfer), or when a radio access capabilities structure for a particular use-type is not supported by an access network.

In the illustrated examples described herein, a mobile station can use use-type radio access capabilities structures in a mutually exclusive manner based on their relevancy to particular types of data transfer sessions. For example, when establishing a machine-to-machine data transfer session, a mobile station can communicate radio access capabilities of a MTC capabilities structure without communicating capabilities described in other use-type structures. In an example implementation, a mobile station selects a use-type capabilities structure from a group of different use-type capabilities structures, each of which is indicative of a different set of radio access capabilities that the mobile station supports (and which further may implicitly indicate the mobile station's support of one or more additional features or capabilities) and that are relevant to a particular type of data transfer session between the mobile station and the wireless network. The mobile station can then format a structural format of a message or an information element (e.g., an information field) in a message based on the selected use-type capabilities structure to indicate the radio access capabilities information corresponding to the selected use-type capabilities structure. In the illustrated examples described herein, the mobile station includes a code in the message that is indicative of the presence of the selected use-type capabilities structure in the message. The mobile station 102 sends the message to the wireless network to request a data channel resource based on the indicated radio access capabilities.

Another example implementation disclosed herein can be used by mobile stations to communicate indicators (e.g., identifiers) of pre-defined radio access capabilities to networks. Such indicators can be radio access capabilities configuration identifiers (RAC configuration IDs) that are pre-defined (e.g., industry-standard definitions), assigned by a network, or negotiated between a mobile station and a network to indicate respective capability configurations (e.g., values for different radio access capabilities). In this manner, a mobile station can inform a network of its support of the radio access capabilities corresponding to a particular RAC configuration ID using only a few bits. For example, the mobile station can generate a message to initiate a data transfer session between itself and a network. The mobile station can select a code value from a plurality of code values, each of the code values pre-defined to indicate a respective subset of radio access capabilities of the mobile station. The mobile station can include the selected code value in the message and send the message to the network. In some example implementations, the mobile station can select and include multiple such code values in the message to indicate a particular combination of pre-defined radio access capabilities.

In yet another example implementation disclosed herein, a mobile station can request a particular quantity of communication blocks to be allocated by a network for use by the mobile station to communicate its radio access capabilities. In this manner, the quantity of blocks requested by the mobile station can be of sufficient and pertinent length to accommodate all of its radio access capabilities that are, for example, relevant to a particular use without having to truncate those capabilities and without having to use more communication block resources than necessary. The mobile station then receives an allocation of the requested quantity of blocks on the data channel from the access network and generates one or more messages based on the allocated quantity of blocks. The mobile station then sends radio access capability information of the mobile station in the one or more messages to the access network on the data channel via the allocated blocks to initiate a data transfer session.

Now turning in detail to FIG. 1, an example mobile communications network 100 is shown in communication with a mobile station 102. The mobile communications network 100 includes an access network 104 and a core network 106. The access network 104 includes an access network interface 108 in communication with the mobile station 102 to enable the mobile station 102 to exchange information with the core network 106. The access network interface 108 can be implemented using a processor-based device or a controller such as, for example, a packet control unit (PCU) for a GSM enhanced radio access network (GERAN), a radio network controller (RNC) for a UMTS radio access network (UMTS RAN), or any other type of controller for any other type of access network.

The core network 106 can be a GPRS core network or a core network of any other communication technology type. In the illustrated example, the core network 106 includes a mobile switching center (MSC) server 110, a serving GPRS support node (SGSN) 112, and a gateway GPRS support node (GGSN) 114. As is known, the SGSN 112 manages subscriber-specific data during subscriber sessions and the GGSN 114 establishes and maintains connections between the core network 106 and external packet data networks 116 (e.g., the Internet, private networks, etc.).

As shown in the illustrated example of FIG. 1, the mobile station 102 registers with the core network 106 upon discovering the access network 104 by performing a registration process 118 using non-access stratum signaling. During the registration process 118, the mobile station 102 sends an initial communication including all or a subset of its radio access capabilities to the core network 106. In some example implementations, the mobile station 102 may send an exhaustive list of its radio access capabilities to the core network 106, while in other example implementations, the mobile station 102 can send radio access capabilities relevant only to downlink data transfers (in which case uplink-relevant capability information can be communicated when the mobile station 102 subsequently requests the access network 104 to establish a data transfer session), or omitting capabilities which are exclusively applicable to uplink data transfers (e.g., the support of extended dynamic allocation (EDA)). Registration using non-access stratum signaling is typically not latency critical and occurs relatively infrequently, and thus, large amounts of information such as an exhaustive list of radio access capabilities can be sent during such a process with little performance impact to the mobile station 102.

In some example implementations, the core network 106 can communicate the list of radio access capabilities received from the mobile station 102 to the access network interface 108 after the registration process 118 such as when initiating a downlink transfer. In some example implementations, some or all of the indications of radio access capabilities sent by the mobile station 102 to the core network 106 (e.g., during the registration process 118 or similar procedures) are different from the radio access capability indications sent by the mobile station 102 to the access network 104 during signaling procedures to request resources for establishing uplink data transfers. Such indications of radio access capabilities sent during different events (e.g., when registering with a core network and when requesting resources to establish an uplink data transfer) can differ either in scope (e.g., capabilities sent to the access network 104 may be those that are only applicable to uplink data transfers and/or capabilities sent to the core network 106 may omit such capabilities or may be exhaustive) or in format (e.g., the capabilities signaled to the core network 106 may use an first structural format in a message or information element, while capabilities signaled to the access network 104 may use a second structural format different from the first structural format).

After registering with the core network 106 using the registration process 118, the mobile station 102 can subsequently, at one or more times while it is registered, request connections with the access network interface 108 to request the access network interface 108 to establish data transfer sessions between the mobile station 102 and the access network 104. For example, as shown in FIG. 1, the mobile station 102 establishes a data transfer session 120 with the access network 104. During a process to establish the data transfer session 120 or after the data transfer session 120 has been established, the mobile station 102 sends mobile station (MS) radio access capabilities information 122 to the access network interface device 108. In the illustrated examples disclosed herein, while the mobile station 102 may send an exhaustive list of its capabilities to the access network 104 during the registration process 118 using non-access stratum signaling, when the mobile station 102 subsequently requests the data transfer session 120, it uses access stratum signaling to send to the access network 104 only the subset of the radio access capabilities that the mobile station 102 intends to use for the data transfer session 120. For example, if the data transfer session 120 is intended for a small data transfer, the MS radio access capabilities 122 communicated by the mobile station 102 to the access network interface 108 will indicate only those radio access capabilities relevant to small data transfers. In this manner, the mobile station 102 need not communicate the exhaustive list of its radio access capabilities every time it requests a data transfer session. Unlike non-access stratum signaling, access stratum signaling is latency critical and can occur relatively more frequently. Thus, reducing the subset of radio access capabilities sent by the mobile station 102 to the access network interface 104 while establishing data transfer sessions can improve the performance and efficiency of data transfer sessions between the mobile station 102 and the access network 104.

The data transfer session 120 can be a small data transfer session, a machine-to-machine data transfer session, an uplink data transfer session, and/or any other type of data transfer session including any combination thereof. In some example implementations, the mobile station 102 can establish the data transfer session 120 by requesting the access network 108 to establish a TBF in accordance with the example methods and apparatus disclosed herein to perform a small data transfer, a machine-to-machine data transfer, an uplink data transfer, etc. The example methods and apparatus disclosed herein facilitate signaling the MS radio access capabilities information 122 to the access network interface 108 using techniques that are relatively more efficient than known techniques.

The example methods and apparatus disclosed herein can be used to send the MS radio access capabilities information 122 using a two-phase access procedure or a one-phase access procedure. FIG. 2 depicts example signaling of a two-phase access procedure 200 and FIG. 3 depicts example signaling of a one-phase access procedure 300. The access procedures 200 and 300 can be used to establish a data transfer session (e.g., the data transfer session 120 of FIG. 1) with a GERAN. Referring to FIG. 2, the mobile station 102 initiates the two-phase access procedure 200 by sending a channel request message 202 to the access network interface 108 via a random access channel (RACH) (or any other suitable available channel). The mobile station 102 indicates in the channel request message 102 that it is requesting to perform a two-phase access procedure.

The access network interface 108 responds by sending an immediate assignment message 204 to the mobile station 102 via a common control channel (CCCH). The immediate assignment message 204 assigns a quantity (N) of blocks allocated on an uplink data channel for use by the mobile station 102 to send its radio access capabilities (e.g., the MS radio access capabilities information 122 of FIG. 1) to the access network interface device 108. The mobile station 102 then generates and sends a packet resource request (PRR) message 206 to the access network interface device 108. The mobile station 102 sends the PRR message 206 via a packet associated control channel (PACCH) using one of the blocks allocated by the access network interface device 108. The PRR message 206 includes a MS radio access capabilities IE including the radio access capabilities of the mobile station 102. Example implementations of the PRR message 206 are described below in connection with FIG. 4.

If additional space is required to communicate the radio access capabilities of the mobile station 102 to the access network interface device 108, the mobile station 102 generates and sends an additional MS radio access capabilities (AMSRAC) message 208 to the access network interface 108 via the PACCH. The AMSRAC message 208 includes another instance of the MS radio access capabilities IE with the additional radio access capabilities of the mobile station 102. The access network interface 108 can use the received capabilities of the mobile station 102 to allocate an uplink data channel based on the received radio access capabilities for use by the mobile station 102 during a data transfer session (e.g., the data transfer session 120 of FIG. 1). The access network interface 108 then communicates a packet uplink assignment message 210 to the mobile station 102 via a packet associated control channel (PACCH). The packet uplink assignment message 210 indicates a data uplink channel allocated to the mobile station 102 for use during the data transfer session 120.

Unlike the two-phase access procedure 200 of FIG. 2 that allocates a data uplink channel after the mobile station 102 sends the PRR message 206 to the access network interface device 108, the one-phase access procedure 300 of FIG. 3 enables allocation of a data uplink channel to the mobile station 102 without needing the mobile station 102 to send a PRR message to the access network interface device 108. To initiate the one-phase access procedure 300 of FIG. 3, the mobile station 102 sends a channel request message 302 to the access network interface 108 via a RACH (or any other available suitable channel). In the channel request message 302, the mobile station 102 requests to perform a one-phase access procedure and can indicate its radio access capabilities. In some example implementations, the amount of information that the mobile station 102 can include in the channel request message 302 to indicate its radio access capabilities may be relatively limited depending on the amount of space available in the channel request message 302. In the illustrated example, the access network interface 108 can determine whether to grant a one-phase access procedure or to require a two-phase access procedure. For example, the access network interface 108 can require a two-phase access procedure if it requires further radio access capabilities information from the mobile station 102.

The access network interface 108 responds by sending an immediate assignment message 304 via a CCCH (or any other available suitable channel). If the access network interface 108 elects to grant the one-phase access procedure, the immediate assignment message 304 will indicate an allocation of an uplink data channel for use by the mobile station 102 to implement the data transfer session 120. In this manner, the mobile station 102 can immediately begin its data transfer.

If the access network interface 108 elects not to grant a one-phase access procedure but to instead require a two-phase access procedure, the immediate assignment message 304 will be substantially similar to the immediate assignment message 204 of FIG. 2 allocating a quantity (N) of blocks for use by the mobile station 102 to communicate further radio access capabilities. As shown in FIG. 3, the mobile station 102 can communicate its radio access capabilities messages to the access network interface 108 using a PRR message 306 (substantially similar or identical to the PRR message 206 of FIG. 2) and optionally an AMSRAC message 308 (substantially similar or identical to the AMSRAC message 208 of FIG. 2) if necessary to communicate additional radio access capabilities that did not fit in the PRR message 306. In such a case, the access network interface 108 may then send a packet uplink assignment message 310 (substantially similar or identical to the packet uplink assignment message 210 of FIG. 2).

Alternatively, the access network interface 108 may elect to grant the one-phase access procedure but request a full or exhaustive listing of radio access capabilities from the mobile station 102. In such instances, the immediate assignment message 304 allocates an uplink data channel to the mobile station 102, and the mobile station 102 communicates the requested radio access capabilities to the access network interface 108 in the PRR message 306 (and the AMSRAC message 308, if more space is required) via the allocated data channel. In addition, the access network interface 108 would not necessarily communicate the packet uplink assignment message 310, because the immediate assignment message 304 already allocated the uplink data channel to the mobile station 102.

Figure 4:
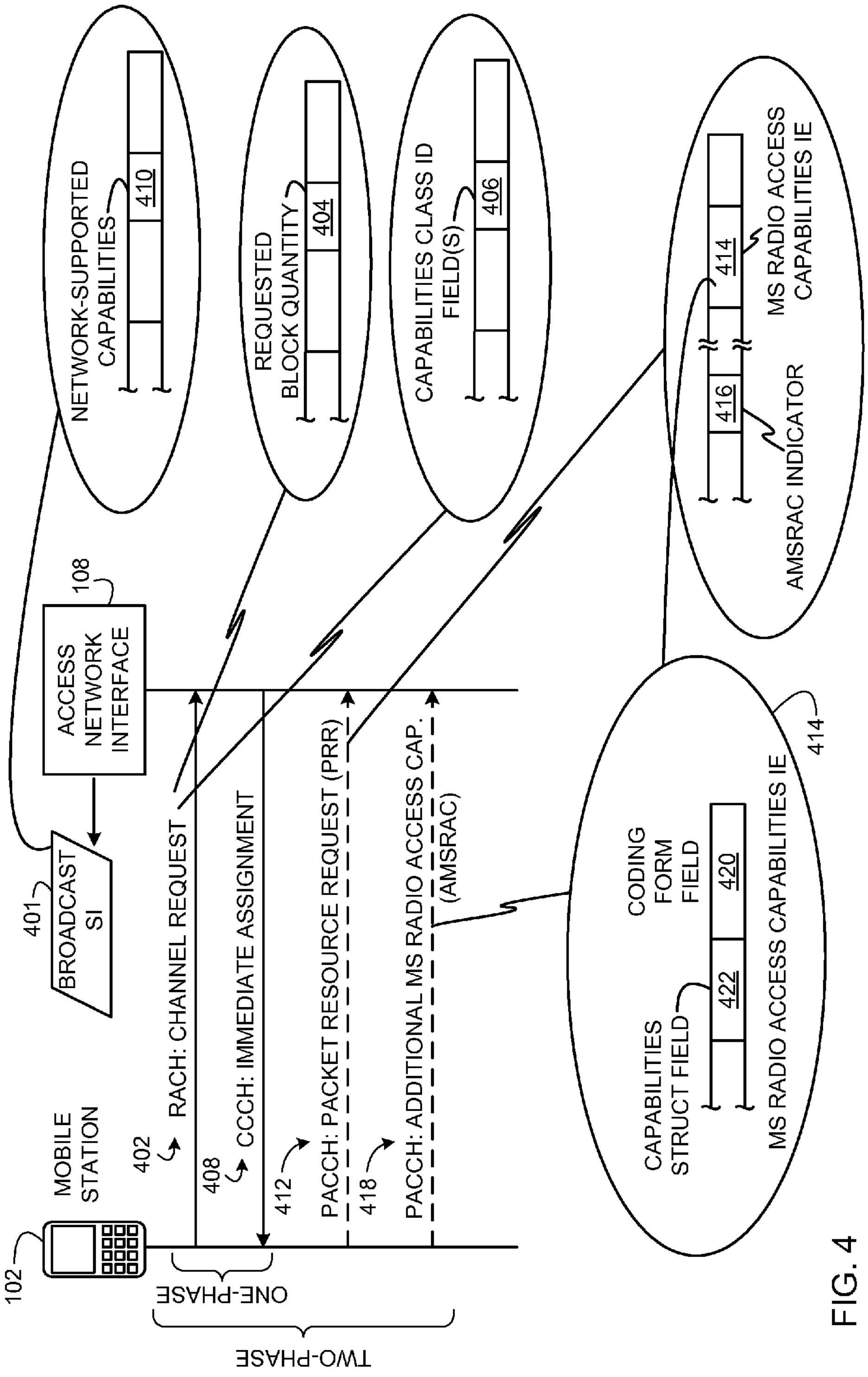
FIG. 4 depicts different example configurations of example messages in accordance with the example methods and apparatus disclosed herein that can be used to communicate mobile station radio access capabilities during a data transfer session setup procedure.

FIG. 4 depicts different example configurations of example messages in accordance with the example methods and apparatus disclosed herein that can be used to communicate mobile station radio access capabilities during a data transfer setup procedure (e.g., the procedures 200 and/or 300 of FIGS. 2 and 3). As shown in FIG. 4, a one-phase access typically involves exchanging a channel request message 402 and an immediate assignment message 408 between the mobile station 102 and the access network interface 108. A two-phase access typically involves exchanging the channel request message 402, the immediate assignment message 408, a packet resource request message 412, and, when additional space is required, an additional MS radio access capabilities message 418. The messages are shown in FIG. 4 to provide example illustrations of different information fields that can be provided therein to facilitate or enable communication radio access capabilities of the mobile station 102 to the access network interface 108 in accordance with the example methods and apparatus disclosed herein. Although FIG. 4 shows the different information fields in connection with particular types of messages, in other example implementations, the information fields may be provided in others of the messages illustrated in FIG. 4 or may be provided in other types of messages not shown in FIG. 4. Thus, the placements of the information fields are shown by way of example in FIG. 4 in connection with particular messages; however, such information fields may additionally or alternatively be placed in other messages.

Now turning in detail to FIG. 4, in some example implementations, the access network interface 108 can broadcast system information (SI) messages 401 to communicate the radio access capabilities supported by the access network 104 (FIG. 1) via a broadcast control channel (BCCH). As shown in FIG. 4, the broadcast SI messages 401 can be configured to include a network-supported capabilities field 410 (or fields) in which the access network interface 108 can indicate the radio access capabilities supported by the access network 104. In some example implementations, the broadcast SI message 401 may also be used to indicate whether the access network 104 supports only specific use-type capability structures (e.g., the MTC capabilities structure 806, but not the SDT capabilities structure 810 of FIG. 8). The network-supported capabilities information can then be used by the mobile station 102 to determine whether it can connect to the access network 104 for a particular use-type data transfer session. Additionally or alternatively, the mobile station 102 can use the network-supported capabilities to filter its radio access capabilities to identify those that are supported by the access network 104 and, thus, communicate only those capabilities to the access network interface device 108. Additionally or alternatively, the access network interface 108 may communicate the network-supported capabilities field(s) 410 to the mobile station 102 via the immediate assignment message 408 or any other message suitable for this purpose.

In some example implementations disclosed herein, the mobile station 102 uses a channel request message 402 during a two-phase access procedure (e.g., the two-phase access procedure 200 of FIG. 2) to indicate a quantity (N) of blocks required for the mobile station 102 to send its radio access capabilities to the access network interface device 108. For example, as shown in FIG. 4, the channel request message 402 can be defined to include a requested block quantity field 404 to indicate the quantity (N) of blocks on an uplink data channel that the mobile station 102 intends to use to send its capabilities. In some example implementations, the mobile station 102 may determine a quantity (N) of blocks value for the requested block quantity field 404 based on a quantity of data or data size required to send the radio access capabilities information (e.g., radio access capabilities relevant for a particular type of use of a data transfer session or radio access capabilities that are commonly supported by the mobile station 102 and the access network 104, which may be for a particular type of use of a data transfer session) of the mobile station 102 to the access network interface 108.

As shown in FIG. 4, the channel request message 402 can include one or more capabilities configuration ID field(s) 406. In some example implementations disclosed herein, the mobile station 102 can use the one or more capabilities configuration ID field(s) 406 of the channel request message 402 during a one-phase access procedure (e.g., the one-phase access procedure 300 of FIG. 3) to send one or more radio access capabilities configuration IDs (e.g., RAC configuration IDs 702 and 706 of FIGS. 7A and 7B) pre-defined to represent a particular radio access capabilities configuration or configurations of the mobile station 102. The pre-defined capabilities configuration IDs can be defined by industry standards, network-assigned, or network-negotiated such that any access network could determine the capabilities configuration of any mobile station based on a capabilities configuration IDs.

In some example implementations disclosed herein, the mobile station 102 uses a PRR message 412 to send its radio access capabilities in a MS radio access capabilities IE field 414 structured or arranged as shown in FIGS. 5 and 8A-8C. In addition, if the length of the MS radio access capabilities IE field 414 is insufficient to include all of the radio access capabilities of the mobile station 102, the mobile station 102 can set an AMSRAC message indicator 416 in the PRR message 412 to indicate that the mobile station 102 will send an AMSRAC message 418 including its additional radio access capabilities using another instance of the MS radio access capabilities IE field 414. Referring briefly to FIG. 5, an example information arrangement 500 of the PRR message 412 (or the PRR messages 206 and 306 of FIGS. 2 and 3) shows the arrangement of the MS radio access capabilities IE field 414 and the AMSRAC message indicator 416 in the content of the PRR message 412.

As shown in FIG. 4, the MS radio access capabilities IE field 414 includes a coding form field 420 and a capabilities structure field 422 to include capabilities information from radio access capabilities structures. As described in more detail below in connection with FIGS. 6 and 8A-8C, the radio access capabilities structures can be use-type structures, each of which indicates radio access capabilities associated with or relevant to a particular type of use (e.g., a machine-to-machine communication session, an uplink-only communication session, a small data transfer session, a general or multi-use communication session) for a data transfer session.

In the illustrated example, values stored in the coding form field 420 indicate which type of radio access capabilities structures is reflected in the capabilities structure field 422. The coding form field 420 can serve as a key for the access network interface 108 to identify the structural format used to represent radio access capabilities information in the capabilities structure field 422. That is, for each form code value (e.g., use-type codes 602 of FIG. 6) that can be stored in the coding form field 420, a different format structure can be used to store radio access capabilities in the capabilities structure field 422 to accommodate the specific types of capabilities applicable for each type of use for a data transfer session.

FIG. 6 is a table 600 showing example use-type codes 602 that can be used in connection with the PRR message 412 and the AMSRAC message 418 of FIGS. 4 and 5 (or the PRR messages 206 and 306 and the AMSRAC messages 208 and 308 of FIGS. 2 and 3) to identify respective use-type radio access capabilities structures encoded in the PRR message 412. In the illustrated example, the use-type codes 602 are shown as sequentially numbered values, each of which is indicative of a respective use-type radio access capabilities structure 604. The mobile station 102 can write or insert the use-type code 602 in the coding form field 420 of the MS radio access capabilities IE 414 shown in FIG. 4 to identify the type of radio access capability structure coding in the capabilities structure field 422. In the illustrated examples described herein, the use-type codes 602 and corresponding use-type radio access capabilities structures 604 may be implemented using the structures shown in FIGS. 8A-8C.

In the illustrated example, the use-type radio access capabilities structures 604 are listings, sets, subsets, or groupings of capabilities referred to as a type A structure 604*a*, a type B structure 604*b*, a type C structure 604*c*, and a type D structure 604*d*. For example, the type A structure 604*a* can be a general capabilities structure indicative of radio access capabilities to establish data transfer sessions between the mobile station 102 and the access network interface 108 of FIGS. 1-4 when a particular type of use for the data transfer is not specified or does not pertain to any of the other radio access capabilities structures. The type B structure 604*b* can be, for example, a machine type communications (MTC) structure indicative of radio access capabilities relevant to (or which may be relevant to) data transfer sessions for use in machine-to-machine data transfers. The type C structure 604*c* can be, for example, an uplink communications structure indicative of radio access capabilities relevant to data transfer sessions for use in uplink-only data transfers. For example, while other radio access capabilities structures (e.g., the structures 604*a*, 604*b*, and 604*d*) can provide capabilities information related to uplink and downlink communications (e.g., uplink/downlink capabilities for MTC or SDT data transfers), the type C structure 604*c* can be indicative of capabilities related only to uplink communications to establish uplink-specific data transfer sessions. The type D structure 604*d* can be, for example, a SDT structure indicative of radio access capabilities applicable to small data transfer sessions. In some instances, the mobile station 102 can send one of the use-type codes 602 and a corresponding one of the use-type radio access capabilities structures 604 when it intends one type of use for a data transfer session.

The use-type codes 602 and corresponding use-type radio access capabilities structures 604 can advantageously be used in the example methods and apparatus disclosed herein to minimize the quantity of radio access capabilities sent by the mobile station 102 to the access network interface 108 to only relevant capabilities when requesting a data transfer session (e.g., the data transfer session 120 of FIG. 1). The use-type codes 602 can also advantageously be used in the example methods and apparatus disclosed herein to facilitate or enable future expansion or future changes of the types of capabilities that can be communicated in the MS radio access capabilities IE 414 of FIG. 4 to accommodate capabilities developed or standardized in the future. For example, when a capability is added to (or removed from) one of the use-type radio access capabilities structures 604, its corresponding use-type code 602 can remain unchanged while identifying the updated use-type radio access capabilities structure 604 in the capabilities structure field 422 of FIG. 4. In addition, subsequently added use-type codes 602 can be specified to identify different use-type capability structures that are supported or standardized in the future.

FIGS. 7A and 7B depict tables 700 and 701 showing example pre-defined radio access capability configurations that may be used to indicate the capabilities of the mobile station 102. The table 700 shows radio access capabilities (RAC) configuration IDs 702, each of which is used to indicate a respective configuration of radio access capabilities settings 704 for GPRS capability subsets. In table 701, each RAC configuration ID 706 is used to indicate a respective configuration of radio access capabilities settings 708 for DTM capability subsets. Each of the radio access capabilities settings 704 and 708 is a listing, set, subset, or grouping of different types of radio access capabilities (e.g., two or more of a multislot classes capabilities type, a supported modulation schemes capabilities type, a packet switched handover capabilities type, a DTM capabilities type, a power class capabilities type, a latency reduction capabilities type, and/or any other suitable types of radio access capabilities) that can be pre-defined in accordance with industry standards, assigned by the access network 108, or negotiated between the mobile station 102 and the access network interface 108. In this manner, the mobile station 102 can inform the access network interface 108 of particular radio access capabilities settings by communicating one or more of the RAC configuration IDs 702 and/or 706 corresponding to its radio access capabilities. Thus, the mobile station 102 need not explicitly communicate all of its radio access capabilities but can instead exclude from (or not include in) a capabilities signaling message (e.g., the channel request message 402 or the PRR message 412 of FIG. 4) the individual radio access capabilities information indicated by the one or more RAC configuration IDs 702 and 706.

The RAC configuration IDs 702 and 706 can be advantageously used in connection with the one-phase access procedure 300 of FIG. 3 because each RAC configuration ID 702 and 706 requires only minimal space in a message (e.g., in the channel request message 302) to indicate radio access capabilities of the mobile station 102. For example, the mobile station 102 can communicate one or more of the RAC configuration IDs 702 and 706 in the capabilities configuration ID field(s) 406 of the channel request message 402 of FIG. 4. In some example implementations, the RAC configuration IDs 702 and 706 can be advantageously used to reduce or eliminate the need to re-convey capabilities information during the same signaling procedure (e.g., the signaling procedures 200 and 300 of FIGS. 2 and 3) to request a data transfer session. In such example implementations, communicating one or more of the RAC configuration IDs 702 and 706 from the mobile station 102 to the access network interface 108 once in the channel request message 402 would be sufficient for the access network interface 108 to establish a data transfer session for the mobile station 102 without requiring the mobile station 102 to re-convey explicit indications of its capabilities via the packet resource request message 412 or any other subsequent message.

In some example implementations, unlike known techniques that require the use of an access control burst (e.g., a GSM access control burst via a random access channel (RACH)) to communicate radio access capabilities from a mobile station to an access network, the RAC configuration IDs 702 and 706 disclosed herein can be advantageously communicated in a payload-carrying data packet via a normal burst (e.g., a GSM normal burst via any data channel). In this manner, the example methods and apparatus disclosed herein can be used to communicate the RAC configuration IDs 702 and 706 from the mobile station 102 to the access network interface 108 using any data packet without needing to use a channel request message (e.g., the channel request messages 202, 302, and 402 of FIGS. 2-4).

Although the RAC configuration IDs 702 and 706 can be advantageously used to inform access networks of radio access capabilities of mobile stations via channel request messages or payload-carrying data packets, in other example implementations, the RAC configuration IDs 702 and 706 can alternatively or additionally be communicated in the PRR message 412 and/or the AMSRAC message 418 of FIG. 4.

In some example implementations, the RAC configuration IDs 702 and 706 can be pre-defined in a hierarchical configuration such that ones of the RAC configuration IDs 702 and 706 having higher values (or lower-values in a numerically descending hierarchy) implicitly indicate that capabilities corresponding to lower valued (or higher valued in a numerically descending hierarchy) ones of the RAC configuration IDs 702 and 706 are also supported by a mobile station. For example, when the RAC configuration IDs 702 and 706 are pre-defined in an ascending hierarchy, the mobile station 102 can send only a single one of the RAC configuration IDs 702 and 706 to inform the access network interface 108 that the mobile station 102 supports the capabilities indicated by that one of the RAC configuration IDs 702 and 706 and all of the capabilities indicated by the lower-valued ones of the RAC configuration IDs 702 and 706, but that were not explicitly communicated by the mobile station 102. In some example implementations, such hierarchies may be pre-defined (or allocated by the access network 104) such that higher-valued (or lower-valued in a numerically descending hierarchy) ones of the RAC configuration IDs 702 and 706 implicitly indicate support of capabilities corresponding to the lower-valued (or higher-valued in a numerically descending hierarchy) ones of the RAC configuration IDs 702 and 706 because support for the higher-valued capabilities requires support for the lower-valued capabilities.

In some example implementations, the radio access capabilities settings 704 and 708 can be defined or configured based on different industry standards including radio access technology standards. For example, the radio access capabilities settings 704 of FIG. 7A are shown as having first, second, and third GPRS capability settings 704*a*, 704*b*, and 704*c* and the radio access capabilities settings 708 of FIG. 7B are shown as having first and second DTM capability settings 708*a* and 708*b*. In the illustrated example, each of the GPRS capability settings 704*a*, 704*b*, and 704*c* indicates different capability settings with respect to the GPRS radio access technology capabilities subset of the table 700 (e.g., different frequency bands, different multislot classes, different shift keying, different timing, etc.). In addition, each of the DTM capability settings 708*a* and 708*b* indicates different capability settings with respect to DTM communications. Although not shown, other types of radio access capabilities subsets can additionally or alternatively be implemented for features or capability types other than GPRS and DTM.

For example implementations in which the RAC configuration IDs 702 and 706 are negotiated between the mobile station 102 and the access network interface 108, the mobile station 102 can send a complete listing of its capabilities (e.g., using a general capabilities structure 804 of FIGS. 8A and 8B) to the access network interface 108. The access network interface 108 can then send the RAC configuration IDs 702 and 706 corresponding to different radio access capabilities settings configurations that the mobile station 102 is capable of supporting. In this manner, the mobile station 102 can use the RAC configuration IDs 702 and 706 assigned by the access network 104 when establishing subsequent data transfer sessions.

In some example implementations, each of the radio access capabilities settings 704 and 708 can be use-type configurations. For example, one of the RAC configuration IDs 702 can be indicative of MTC radio access capabilities of the mobile station 102 while other ones of the RAC configuration IDs 702 can be indicative of uplink radio access capabilities and/or small data transfer capabilities of the mobile station 102. In this manner, when the mobile station 102 intends to use a data transfer session (e.g., the data transfer session 120 of FIG. 1) for a particular type of use, the mobile station 102 can indicate its radio access capabilities to the access network interface 108 using a respective one of the RAC configuration IDs 702 and/or 706.

In other example implementations, the RAC configuration IDs 702 and 706 can be indicative of radio access technologies for respective technology types (e.g., capabilities of respective frequency bands) and/or can be indicative of device classes associated with, for example, different MTC or SDT capabilities. In this manner, when the mobile station 102 intends to communicate over a data transfer session (e.g., the data transfer session 120 of FIG. 1) using a particular type of access technology or device class capabilities, the mobile station 102 can indicate its radio access capabilities for the access technology type to the access network interface 108 using a respective one of the RAC configuration IDs 702 and 706.

In some instances, the mobile station 102 can send one of the RAC configuration IDs 702 and/or 706 to indicate a single one of the radio access capabilities settings 704 and/or 708. In other instances, the mobile station 102 can send two or more of the RAC configuration IDs 702 and/or 706 to indicate multiple ones of the radio access capabilities settings 704 and/or 708. For example, the mobile station 102 can send two of the RAC configuration IDs 702 related to GPRS capabilities (e.g., send GPRS#01 and GPRS#02) or the mobile station 102 can send one or more of the RAC configuration IDs 702 and one or more of the RAC configuration IDs 706 to indicate GPRS and DTM capabilities (e.g., send GPRS#01 and DTM#02).

FIGS. 8A-8C depict example structural formats that can be used to send radio access capabilities information of the mobile system 102 (FIGS. 1-4) to the access network interface 108 (FIGS. 1-4) in the MS radio access capabilities IE 414 (FIG. 4) during the example signaling exchanges of FIGS. 2-4. In the illustrated examples described herein, use-type radio access capabilities structures shown in FIGS. 8A-8C can be advantageously used to limit the multislot classes, switching times, and packet switched handover capabilities indicated to the access network 104 as supported by the mobile station 102 to only those capabilities relevant to a requested data transfer session. In some example implementations, the mobile station 102 implicitly or expressly informs the access network 104 that the radio access capabilities information indicated thereby is not complete (e.g., support for one or more radio access capabilities may be implicit in the use of some or any of the use-type radio access capabilities structures). Additionally or alternatively, the mobile station 102 informs (e.g., implicitly through the use of some or any of the use-type radio access capabilities structures shown in FIGS. 8A-8C) the access network 104 that further radio access capabilities of the mobile station 102 can be obtained from the core network 106 (FIG. 1). Also, some of the use-type radio access capabilities structures can enable or facilitate omitting capabilities not related to GSM communications.

As shown in FIG. 8A, an MS radio access capabilities value part structure 802 specifies example formats for encoding the use-type codes 602 of FIG. 6 in the coding form field 420 of the MS radio access capabilities IE 414 of FIG. 4. A general capabilities structure 804 of FIGS. 8A and 8B specifies example formats for encoding an exhaustive or complete listing of radio access capabilities of the mobile station 102 in the capabilities structure field 422 of the MS radio access capabilities IE 414 of FIG. 4. The general capabilities structure 804 can be used to implement the type A structure 604*a* of FIG. 6. The general radio access capabilities can be used to establish a data transfer session between the mobile station 102 and the access network interface device 108 when a particular type of use for the data transfer session is not indicated or does not pertain to any other available radio access capabilities structure of the mobile station 102.

A MTC capabilities structure 806 shown in FIG. 8B specifies example formats for encoding MTC radio access capabilities of the mobile station 102 in the capabilities structure field 422 of the MS radio access capabilities IE 414 of FIG. 4. The MTC capabilities structure 806 can be used to implement the type B structure 604*b* of FIG. 6 to establish data transfer sessions for use in machine-to-machine data transfers.

An uplink capabilities structure 808 shown in FIG. 8C specifies example formats for encoding uplink-specific radio access capabilities of the mobile station 102 in the capabilities structure field 422 of the MS radio access capabilities IE 414 of FIG. 4. For example, while other radio access capabilities structures (e.g., the structures 804, 806, and 810) can provide capabilities information related to uplink and downlink communications (e.g., uplink/downlink capabilities for MTC or SDT data transfers), the uplink capabilities structure 808 can be indicative of capabilities related only to uplink communications to establish uplink-specific data transfer sessions. The uplink capabilities structure 808 can be used to implement the type C structure 604*c* of FIG. 6 to establish data transfer sessions for use in uplink data transfers.

An SDT capabilities structure 810 shown in FIG. 8C specifies example formats for encoding small data transfer radio access capabilities of the mobile station 102 in the capabilities structure field 422 of the MS radio access capabilities IE 414 of FIG. 4. The SDT capabilities structure 810 can be used to implement the type D structure 604*d* of FIG. 6 to establish data transfer sessions for use in small data transfers. For purposes of brevity, some radio access capabilities information of the SDT capabilities structure 810 is not shown in detail.

An additional access technologies structure 812 shown in FIG. 8C specifies whether other access technology types (e.g., other frequency bands) are supported by the mobile station 102. In some example implementations, the additional access technologies structure 812 can be encoded in the capabilities structure field 422 of the MS radio access capabilities IE 414 of FIG. 4 in connection with any of the capabilities structures 804, 806, 808, or 810 to indicate different access technology types for which the mobile station 102 supports the radio access capabilities of the capabilities structures 804, 806, 808, or 810.

FIGS. 9-13 depict example flow diagrams representative of example processes that may be implemented using hardware and/or computer readable instructions that may be used to communicate radio access capabilities of a mobile station (e.g., the mobile station 102 of FIGS. 1-4) to an access network (e.g., the access network 104 of FIG. 1). The example operations of FIGS. 9-13 may be performed using a processor, a controller and/or any other suitable processing device. For example, the example operations of FIGS. 9-13 may be implemented using coded instructions stored on a tangible medium such as a flash memory, a read-only memory (ROM) and/or random-access memory (RAM) associated with a processor (e.g., the processor 1402 of FIG. 14). Alternatively, some or all of the example operations of FIGS. 9-13 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example operations of FIGS. 9-13 may be implemented manually or as any combination(s) of any of the foregoing techniques, for example, any combination of firmware, software, discrete logic and/or hardware. Further, although the example operations of FIGS. 9-13 are described with reference to the flow diagrams of FIGS. 9-13, other methods of implementing the operations of FIGS. 9-13 may be employed. For example, the order of execution of the blocks may be changed, and/or some of the blocks described may be changed, eliminated, sub-divided, or combined. Additionally, any or all of the example operations of FIGS. 9-13 may be performed sequentially and/or in parallel by, for example, separate processing threads, processors, devices, discrete logic, circuits, etc.

The example flow diagrams of FIGS. 9-13 are described in connection with the example signaling diagram of FIG. 400. Some implementations of the flow diagrams can be implemented using two-phase access procedures such as the two-phase access procedure 200 of FIG. 2, while other implementations of the flow diagrams can be implemented using one-phase access procedures such as the one-phase access procedure 300 of FIG. 3.

Figure 9:
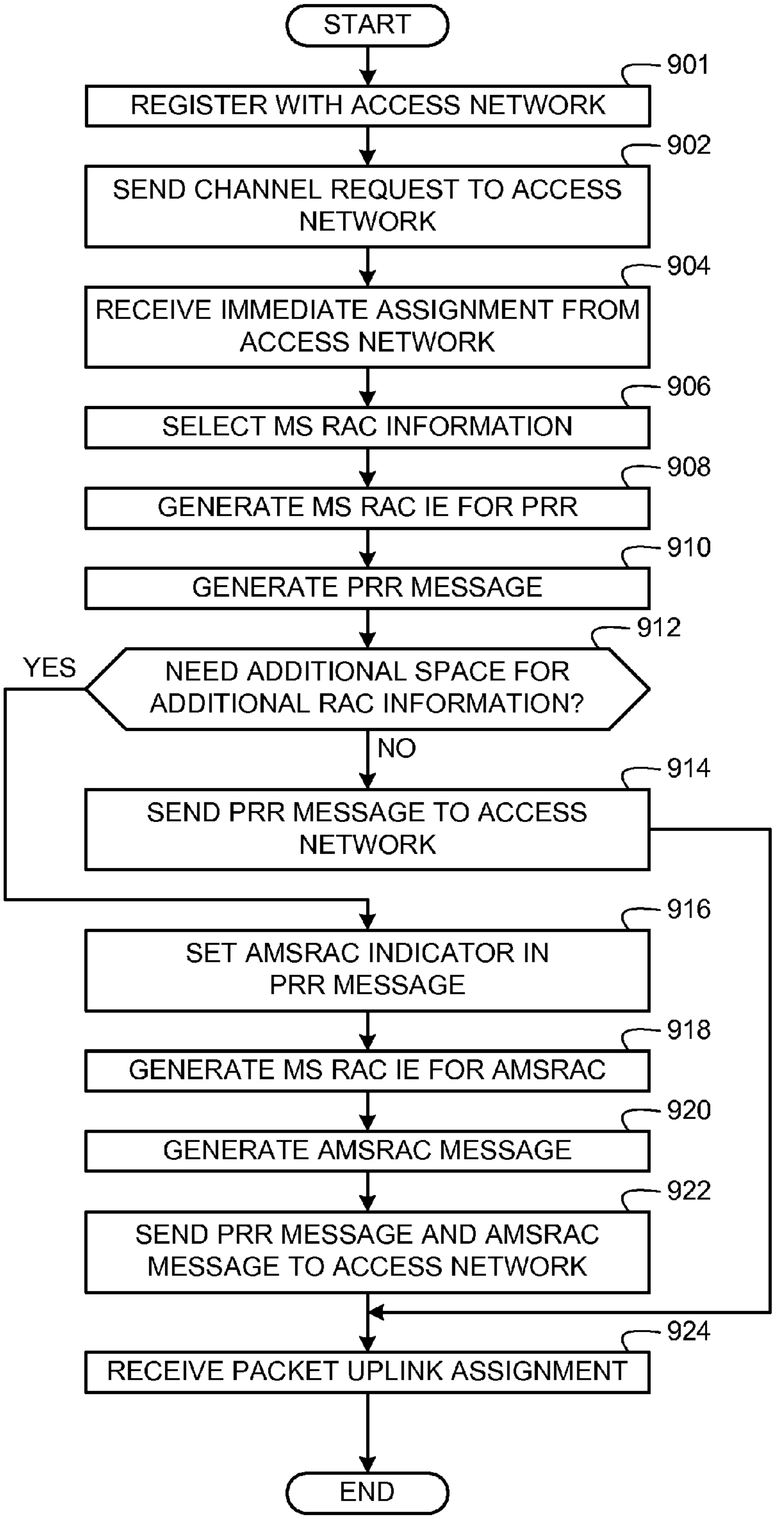
FIG. 9 is a flow diagram representative of an example process that may be implemented using hardware and/or machine readable instructions to select and communicate radio access control information of the mobile station of FIGS. 1-4.

FIG. 9 is a flow diagram representative of an example process that may be implemented using machine readable instructions to select and communicate radio access control information of the mobile station 102 of FIGS. 1-4. Initially, the mobile station 102 registers with the core network 106 of FIG. 1 (block 901). For example, upon discovering the access network 104, the mobile station 102 can perform the registration process 118 (FIG. 1) using non-access stratum signaling and send an exhaustive list of its radio access capabilities or a list of downlink radio access capabilities to the core network 106 (FIG. 1).

When the mobile station 102 intends to perform a data transfer, the mobile station 102 sends the channel request message 402 of FIG. 4 to the access network interface 108 (block 902). In the illustrated example, the mobile station 102 requests in the channel request message 402 to perform a two-phase access procedure (e.g., the two-phase access procedure 200 of FIG. 2). In some example implementations, the mobile station 102 may also use the channel request message 402 to request a quantity (N) of blocks to be allocated on an uplink data channel to it by the access network 104 to use for communicating its radio access capabilities. Such an allocation of blocks can be requested using, for example, the requested block quantity field 404 of FIG. 4. In some example implementations, the mobile station 102 may determine a quantity (N) of blocks value for the requested block quantity field 404 based on a quantity of data or data size required to send the radio access capabilities information (e.g., radio access capabilities relevant for a particular type of use of a data transfer session or radio access capabilities that are commonly supported by the mobile station 102 and the access network 104, which may be for a particular type of use of a data transfer session) of the mobile station 102 to the access network interface 108.

The mobile station 102 receives the immediate assignment message 408 from the access network interface 108 (block 904). In the illustrated example, the immediate assignment message 408 indicates a quantity (N) of blocks allocated to the mobile station 102 on an uplink data channel to communicate its radio access capabilities to the access network 104. In some example implementations, the quantity (N) of blocks may be a quantity requested by the mobile station 102, while in other example implementations, the quantity (N) of blocks may be allocated by the access network 104 regardless of a particular quantity requested by the mobile station 102.

The mobile station 102 selects its mobile station radio access capabilities information to send to the access network interface 108 (block 906). The mobile station 102 can use any of the techniques described above in connection with FIGS. 4-7 and 8A-8C to select the radio access capabilities information. The example flow diagrams of FIGS. 10-12 described below can be used to implement block 906.

The mobile station 102 generates the mobile station radio access capabilities information element (MS RAC IE) 414 of FIGS. 4 and 5 for the PRR message 412 of FIG. 4 (block 908). The mobile station 102 then generates the PRR message 412 of FIG. 4 to include the MS RAC IE 414 (block 910). The mobile station 102 determines whether it needs additional space for additional radio access capabilities information (block 912). For example, the mobile station 102 may require further space than available in the PRR message 412 to communicate its capabilities. If the mobile station 102 determines that it does not need additional space (block 912), the mobile station 102 sends the PRR message 412 to the access network interface 108 (block 914).

If the mobile station 102 determines that it needs additional space (block 912), the mobile station 102 sets a value in the AMSRAC indicator field 416 (FIG. 4) of the PRR message 412 (block 916) to indicate that it will communicate additional radio access capability information in the AMSRAC message 418 of FIG. 4 to the network access interface device 108. The mobile station 102 generates another instance of the MS RAC IE 414 with the additional capabilities for the AMSRAC message 418 (block 918). The mobile station 102 then generates the AMSRAC message 418 (block 920) including the additional instance of the MS RAC IE 414 with the additional radio access capabilities. The mobile station 102 sends the PRR message 412 and the AMSRAC message 418 to the access network interface 108 (block 922). The access network interface 108 can be configured to decode and use the capabilities information in the PRR message 412 and the AMSRAC message 418 in a number of ways. For example, the access network interface 108 can begin decoding and using the access capabilities in the PRR message 412 to begin allocating an uplink data channel prior to receiving the AMSRAC message 418 and then decode the AMSRAC message 418 to finish allocating and configuring the uplink data channel in accordance with the radio access capabilities indicated by the mobile station 102. Alternatively, the access network interface 108 can wait until it has received both the PRR message 412 and the AMSRAC message 418 before decoding and using the radio access capabilities information to allocate and configure the uplink data channel for the mobile station 102.

After the mobile station 102 sends the PRR message 412 and the AMSRAC message 418 at block 922 or after the mobile station 102 sends the PRR message 412 at block 914 without setting the AMSRAC indicator field 416, the mobile station 102 receives a packet uplink assignment message (e.g., the packet uplink assignment message 210) (block 924) from the access network interface device 108. The packet uplink assignment message indicates an uplink data channel allocated to the mobile device 102 via which to perform the data transfer session 120 (FIG. 1). In the illustrated example, the access network interface 108 allocates and configures the uplink data channel in accordance with the radio access capabilities provided by the mobile station 102. The example process of FIG. 9 then ends.

Figure 10:
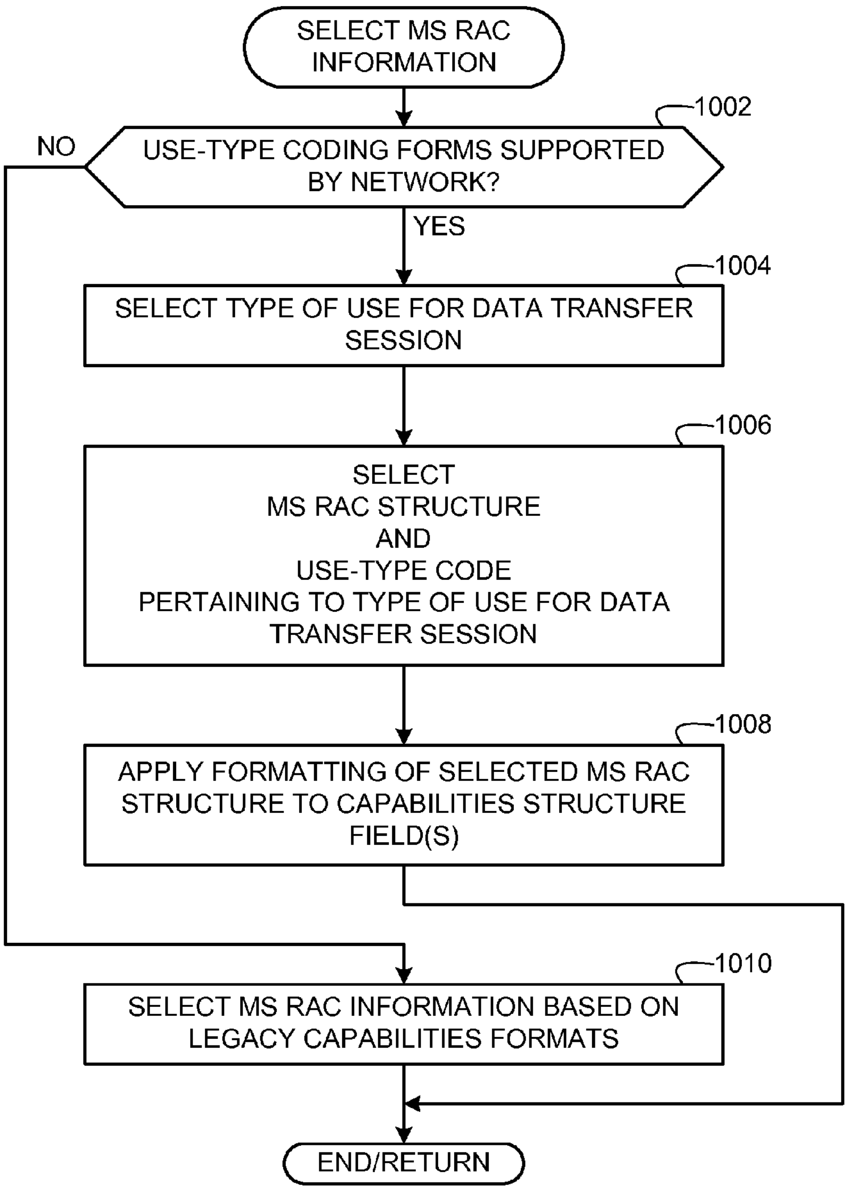
FIG. 10 is a flow diagram representative of an example process that may be implemented using hardware and/or machine readable instructions to select radio access capabilities information of the mobile station of FIGS. 1-4.

FIG. 10 is a flow diagram representative of an example process that may be implemented using machine readable instructions to select radio access capabilities information of the mobile station 102 of FIGS. 1-4. In some example implementations, the example process of FIG. 10 can be used to implement block 906 of FIG. 9. In the illustrated example process of FIG. 10, radio access capabilities are selected using the use-type codes 602 of FIG. 6 and their associated use-type radio access capabilities structures 604.

Initially, the mobile station 102 determines whether and which of the use-type coding forms (e.g., the use-type codes 602 and associated capabilities structures 604 of FIG. 6) are supported by the access network 104 (block 1002). For example, the access network 104 may communicate an indication of support for such coding forms in the broadcast SI message 401 (FIG. 4) (or in any other suitable message). In some example implementations, the broadcast SI message 401 may also be used to indicate whether the access network 104 supports only some (but not all) use-type capability structures (e.g., the access network 104 supports the MTC capabilities structure 806, but not the SDT capabilities structure 810 of FIG. 8) and their identities. For instance, networks could be configured to have default support for the general capabilities structure 804 (FIGS. 8A and 8B) and networks that support optimized capabilities for MTC and/or SDT could additionally support the MTC capabilities structure 806 and/or the SDT capabilities structure 810. Additionally or alternatively, particular use-type capabilities could be implicitly supported by an access network on specific channel types supported by the access network. In some instances, some types of channels that can be allocated by access networks may support only MTC communications, while other types of channels may support only SDT communications.

If the access network 104 supports the use-type coding form(s) (block 1002) preferred by or available to the mobile station 102, the mobile station 102 selects the corresponding type of use for the data transfer session it is establishing (block 1004). Example types of uses may be a machine-to-machine data transfer use, an uplink data transfer use, a small data transfer use, or any other type of use. The mobile station 102 then selects a MS radio access capabilities structure (e.g., one of the use-type radio access capabilities structures 604 of FIG. 6 or structures 804, 806, 808, and 810 of FIG. 8) and a corresponding use-type code (e.g., one of the use-type codes 602 of FIG. 6) pertaining to the type of use for the data transfer session (block 1006).

The mobile station 102 applies a corresponding formatting of the selected MS radio access capabilities structure to the structural format of the capabilities structure field 422 of the MS radio access capabilities IE 414 of FIG. 4 (block 1008). In this manner, the mobile station 102 can encode the MS radio access capabilities IE 414 at block 908 of FIG. 9 with one of the use-type codes 602 and the corresponding radio access capabilities information in accordance with a structural format of the selected MS radio access capabilities structure.

If the mobile station 102 determines at block 1002 that the access network 104 does not support use-type coding forms, the mobile station 102 can select radio access capability information based on legacy capabilities formats (block 1010). The mobile station 102 can then encode the radio access capabilities information in the MS radio access capabilities IE 414 at block 908 of FIG. 9 in accordance with a legacy structural format. After block 1006 or after block 1008, the example process of FIG. 10 ends and/or returns control to a calling function or process such as the example process of FIG. 9.

Figure 11:
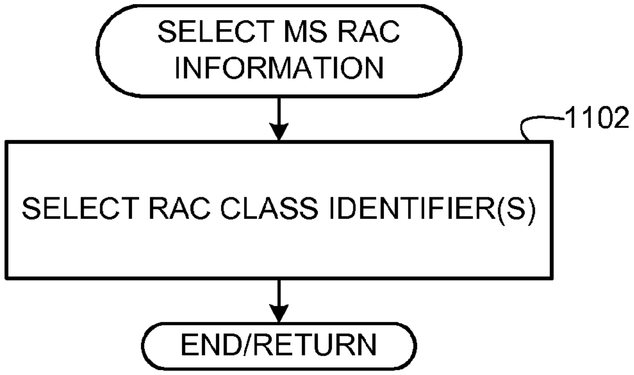
FIG. 11 is a flow diagram representative of another example process that may be implemented using hardware and/or machine readable instructions to select radio access capabilities information of the mobile station of FIGS. 1-4.

FIG. 11 is a flow diagram representative of another example process that may be implemented using machine readable instructions to select radio access capabilities information of the mobile station 102 of FIGS. 1-4. In some example implementations, the example process of FIG. 11 can be used to implement block 906 of FIG. 9 or block 1302 of FIG. 13. In the illustrated example process of FIG. 11, radio access capabilities are selected using the RAC configuration IDs 702 and/or 706 of FIGS. 7A and 7B.

In the example process of FIG. 11, the mobile station 102 selects one or more RAC configuration ID(s) 702, 706 (block 1102). As discussed above in connection with FIGS. 7A and 7B, the RAC configuration IDs 702, 706 correspond to different ones of the radio access capabilities settings 704, 708. In this manner, the mobile station 102 can insert the selected RAC configuration ID(s) 702,706 in the channel request message 402 or the PRR message 412 of FIG. 4 to indicate its capabilities to the access network 104. The example process of FIG. 11 ends and/or returns control to a calling function or process such as the example process of FIG. 9 or the example process of FIG. 13.

Figure 12:
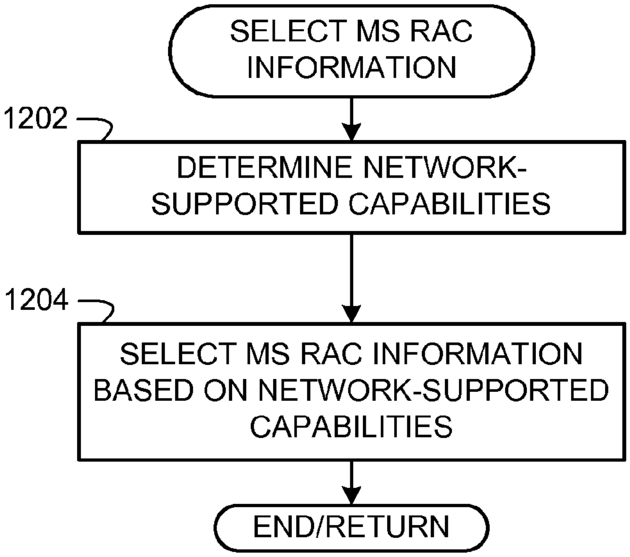
FIG. 12 is a flow diagram representative of another example process that may be implemented using hardware and/or machine readable instructions to select radio access capabilities information of the mobile station of FIGS. 1-4.

FIG. 12 is a flow diagram representative of another example process that may be implemented using machine readable instructions to select radio access capability information of the mobile station 102 of FIGS. 1-4. In some example implementations, the example process of FIG. 12 can be used to implement block 906 of FIG. 9. In the illustrated example process of FIG. 12, radio access capabilities are selected based on radio access capabilities supported by the access network 104.

Initially, the mobile station 102 determines which radio access capabilities are supported by the access network 104 (block 1202). For example, the mobile station 102 can receive the broadcast SI messages 401 (FIG. 4) from the access network interface 108 indicating the radio access capabilities that are supported by the access network 104. For example, the access network interface 108 can indicate such supported capabilities using the network-supported capabilities field(s) 410 of FIG. 4. The mobile station 102 then selects its radio access capabilities (using, for example, one or more of the techniques disclosed herein) based on the network-supported capabilities (block 1204). The example process of FIG. 12 ends and/or returns control to a calling function or process such as the example process of FIG. 9.

Figure 13:
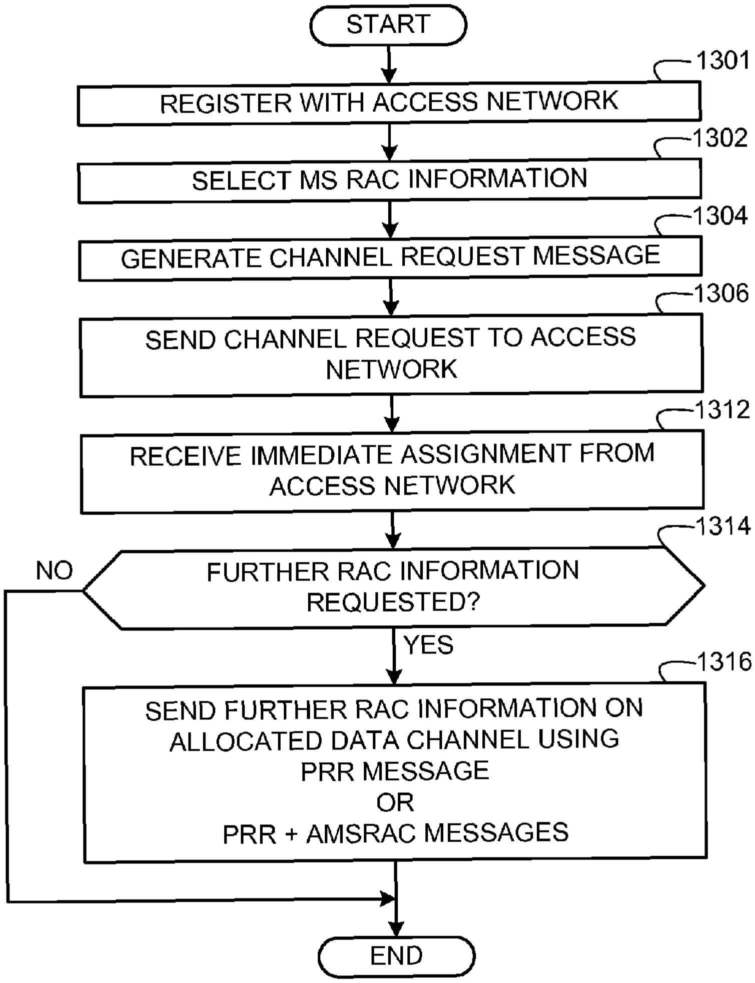
FIG. 13 is a flow diagram representative of an example process that may be implemented using hardware and/or machine readable instructions to implement the example capabilities signaling exchange in which a mobile station requests a one-phase access procedure.

FIG. 13 is a flow diagram representative of an example process that may be implemented using machine readable instructions to implement an example radio access capabilities signaling exchange in which the mobile station 102 requests a one-phase access procedure (e.g., the one-phase access procedure 300 of FIG. 3). Initially, the mobile station 102 registers with the core network 106 of FIG. 1 (block 1301). For example, upon discovering the access network 104, the mobile station 102 can perform the registration process 118 (FIG. 1) using non-access stratum signaling and send an exhaustive list of its radio access capabilities or a list of downlink radio access capabilities to the core network interface 106 (FIG. 1).

When the mobile station 102 intends to perform a data transfer, the mobile station 102 selects its radio access capabilities information (block 1302) to indicate to the access network 104. In the illustrated example, the mobile station 102 selects radio access capabilities based on the RAC configuration IDs 702 and/or 706 of FIGS. 7A and 7B as described above in connection with FIG. 11. In this manner, the mobile station 102 can communicate its radio access capabilities to the access network 104 using a relatively small quantity of bits in the channel request message 402 (FIG. 4).

The mobile station 102 generates the channel request message 402 (block 1304). In the channel request message 402, the mobile station 102 includes the mobile station radio access capabilities information selected at block 1302 and a request to establish a data transfer session using a one-phase access procedure (e.g., the one-phase access procedure 300 of FIG. 3). For example, the mobile station 102 can set a selected one or more of the RAC configuration IDs 702, 706 in the capabilities configuration ID field(s) 406 (FIG. 4) of the channel request message 402. The mobile station 102 sends the channel request message 402 to the access network interface 108 (block 1306).

The mobile station 102 receives the immediate assignment message 408 from the access network interface 108 (block 1312). The immediate assignment message 408 indicates an uplink data channel allocated for use by the mobile station 102 to perform the data transfer session 120 (FIG. 1). In the illustrated example, the uplink data channel is allocated and configured in accordance with the radio access capabilities provided by the mobile station 102.

In some example implementations, the access network 104 may grant the one-phase access procedure requested by the mobile station 102, but will require further radio access capabilities information from the mobile station 102 (e.g., a full or exhaustive listing of radio access capabilities of the mobile station 102). If the mobile station 102 determines that the access network 104 has not requested further radio access capabilities information from the mobile station 102 (block 1314), then the data transfer session 120 is established between the mobile station 102 and the access network 104 (based on a one-phase access procedure), and the example process of FIG. 13 ends. However, if the mobile station 102 determines that the access network 104 has requested further radio access capabilities information from the mobile station 102 (block 1314), the mobile station 102 sends the further radio access capabilities information on the allocated data channel using a PRR message (e.g., the PRR message 412 of FIG. 4) or PRR and AMSRAC messages (the PRR message 412 and the AMSRAC message 418 of FIG. 4) (block 1316). For example, the mobile station 102 may use the PRR message 412 and the AMSRAC message 418 when the PRR message 412 does not provide sufficient space to communicate all of the requested radio access capabilities to the access network 104. In the illustrated example, block 1316 may be implemented using operations similar or identical to the operations described above in connection with blocks 906, 908, 910, 912, 914, 916, 918, 920, and 922 of FIG. 9. The example process of FIG. 13 then ends.

Figure 14:
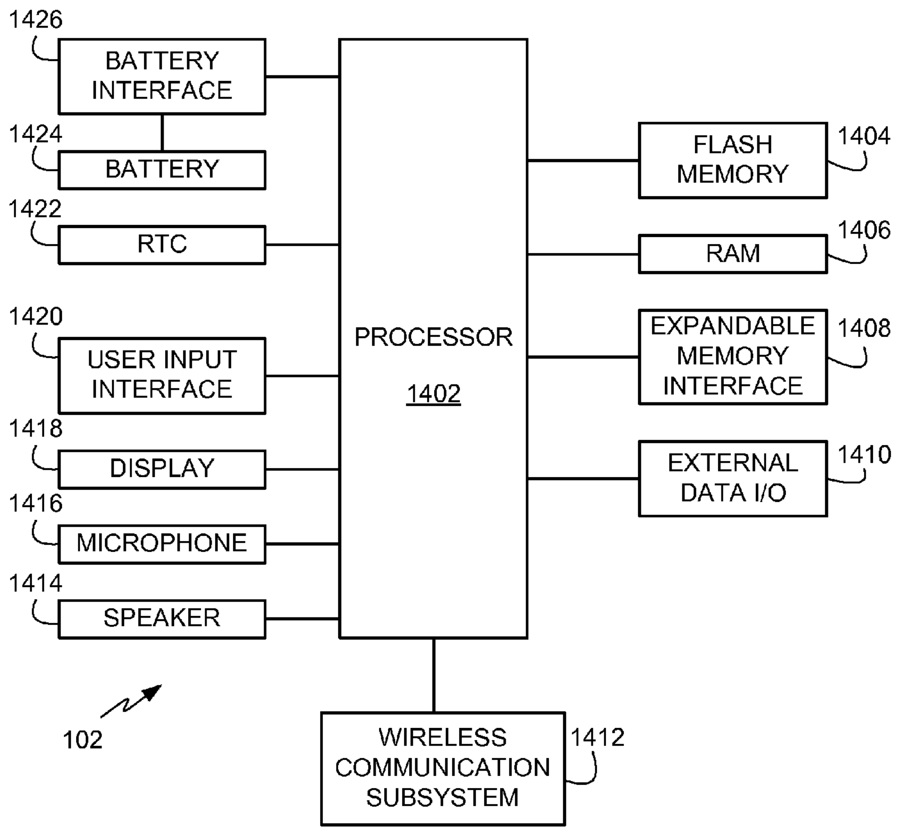
FIG. 14 is an example block diagram of the mobile station of FIGS. 1-4 that can be used to implement the example methods and apparatus disclosed herein.

Now turning to FIG. 14, an illustrated example of the mobile station 102 of FIGS. 1-4 is shown in block diagram form. In the illustrated example, the mobile station 102 includes a processor 1402 that may be used to control the overall operation of the mobile station 102. The processor 1402 may be implemented using a controller, a general purpose processor, a digital signal processor, dedicated hardware, or any combination thereof.

The example mobile station 102 also includes a FLASH memory 1404, a random access memory (RAM) 1406, and an expandable memory interface 1408 communicatively coupled to the processor 1402. The FLASH memory 1404 can be used to, for example, store computer readable instructions and/or data. In some example implementations, the FLASH memory 1404 can be used to store one or more of the data structures of FIGS. 5-7 and 8A-8C. The RAM 1406 can also be used to, for example, store data and/or instructions. The mobile station 102 is also provided with an external data I/O interface 1410. The external data I/O interface 1410 may be used by a user to transfer information to and from the mobile station 102 through a wired medium.

The mobile station 102 is provided with a wireless communication subsystem 1412 to enable wireless communications with wireless networks such as mobile communication networks, cellular communications networks, wireless local area networks (WLANs), etc. To enable a user to use and interact with or via the mobile station 102, the mobile station 102 is provided with a speaker 1414, a microphone 1416, a display 1418, and a user input interface 1420. The display 1418 can be an LCD display, an e-paper display, etc. The user input interface 1420 could be an alphanumeric keyboard and/or telephone-type keypad, a multi-direction actuator or roller wheel with dynamic button pressing capability, a touch panel, etc.

The mobile station 102 is also provided with a real-time clock (RTC) 1422 to track dates and a current time of day and/or to implement time-based and/or date-based operations. In the illustrated example, the mobile station 102 is a battery-powered device and is, thus, provided with a battery 1424 and a battery interface 1426.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to communicate capabilities of a mobile station, comprising:

determining a type of use for a data transfer session;

in response to determining the type of use, identifying a listing of the radio access capabilities of the mobile station, wherein the listing includes radio access capabilities pertaining to the determined type of use and excludes some of the radio access capabilities that are irrelevant to the determined type of use;

sending a request to a network, the request requesting a particular quantity of blocks to be allocated for use by the mobile station to send the listing of the radio access capabilities of the mobile station, wherein the particular quantity of blocks is determined by the mobile station based on a data size, the data size corresponding to an amount of data to transmit the listing of the radio access capabilities of the mobile station, and the particular quantity of blocks indicated by a value located in the request;

receiving an allocation of the quantity of blocks from the network; and sending the list of the radio access capabilities of the mobile station via the allocated blocks.

2. A method as defined in claim 1, wherein the request is a channel request message sent by the mobile station to the network, wherein the allocation of the quantity of blocks is received at the mobile station in an assignment message, and wherein the radio access capability information of the mobile station is sent to the network via an associated control channel.

3. A method as defined in claim 1, wherein the request is a channel request message.

4. A method as defined in claim 1, wherein sending the second listing of the radio access capabilities of the mobile station to the network comprises sending the second listing of the radio access capabilities during a temporary block flow setup process.

5. A method as defined in claim 1, wherein the second listing of the radio access capabilities pertains at least to a specific type of use by the mobile station for the data transfer session.

6. A method as defined in claim 1, wherein the quantity of blocks is determined based on radio access capabilities that are supported by the network and the mobile station.

7. A method as defined in claim 1, wherein the first listing of the radio access capabilities is one of an exhaustive listing of radio access capabilities or a listing of radio access capabilities relevant only to downlink communications to the core network.

8. A computer readable storage memory having instructions stored thereon that, when executed, cause a machine to implement the method as defined in claim 1.

9. A method as defined in claim 1, wherein the request does not request more blocks than are to be used to identify the radio access capabilities.

10. A method as defined in claim 1, wherein the type of use is selectable at the mobile station from a group comprising:

(a) a first use type to transfer an amount of data less than a predetermined threshold, (b) a second use type to transfer information generated at the mobile station, and (c) a third use type for an uplink-only transfer of information, wherein each use type is associated with a respectively different portion of the first listing of radio access capabilities.

11. An apparatus to communicate capabilities of a device, comprising:

a processor configured to:

determine a type of use for a data transfer session;

in response to determining the type of use, identify radio access capabilities of a mobile station that pertains to the determined type of use;

send a request to a network, the request requesting a particular quantity of blocks to be allocated for use by a mobile station, wherein the particular quantity of blocks is determined by the mobile station based on a data size, the data size determined by the mobile station to be an amount of data of the identified radio access capabilities of the mobile station without requesting more blocks than needed to send the identified radio access capabilities, and the particular quantity of blocks indicated by a value located in the request;

receive an allocation of the quantity of blocks from the network; and send the identified radio access capability information of the mobile station via the allocated blocks.

12. An apparatus as defined in claim 11, wherein the request is a channel request message sent by the mobile station to the network, wherein the allocation of the quantity of blocks is received at the mobile station in an assignment message, and wherein the radio access capability information of the mobile station is sent to the network via an associated control channel.

13. An apparatus as defined in claim 11, wherein the request is a channel request message.

14. An apparatus as defined in claim 11, wherein the processor is configured to send the radio access capability information of the mobile station to the network during a temporary block flow setup process.

15. An apparatus as defined in claim 11, wherein the radio access capability information pertains at least to a specific type of use by the mobile station for the data transfer session.

16. An apparatus as defined in claim 11, wherein the processor is configured to determine the quantity of blocks based on radio access capabilities that are supported by the network and the mobile station.

17. An apparatus as defined in claim 11, wherein the processor is configured to send the radio access capability information of the mobile station to the network after the mobile station registers with a core network of the network during a registration process, and wherein during the registration process, the processor is configured to send one of an exhaustive listing of radio access capabilities or a listing of radio access capabilities relevant only to downlink communications to the core network.

* * * * *